US005822701A

United States Patent [19]

Tomisato et al.

[11] Patent Number: 5,822,701

[45] Date of Patent: Oct. 13, 1998

[54] HIGH-SPEED RADIO COMMUNICATION SYSTEM

[75] Inventors: Shigeru Tomisato, Yokohamashi; Hiroshi Suzuki, Yokosukashi; Kenkichi Hirade, Miurashi, all of Japan

[73] Assignee: NTT Mobile Communications Network Inc., Tokyo, Japan

[21] Appl. No.: 696,835

[22] PCT Filed: Feb. 27, 1996

[86] PCT No.: PCT/JP96/00455

§ 371 Date: Aug. 27, 1996

§ 102(e) Date: Aug. 27, 1996

[87] PCT Pub. No.: WO96/27245

PCT Pub. Date: Sep. 6, 1996

[30] Foreign Application Priority Data

Feb. 27, 1995 [JP] Japan .................................... 7-038610

[51] Int. Cl.[6] ................................ H04B 1/00; H04B 7/00

[52] U.S. Cl. .......................... 455/502; 455/524; 455/525; 455/517; 455/507

[58] Field of Search .................................... 455/524, 525, 455/422, 517, 507, 509, 566, 450, 502; 379/90.01, 93.09

[56] References Cited

U.S. PATENT DOCUMENTS

| | | | |
|---|---|---|---|
| 4,028,500 | 6/1977 | McClure et al. | 455/33.1 |
| 4,771,448 | 9/1988 | Koohgoli et al. | 455/33 |
| 5,230,082 | 7/1993 | Ghisler et al. | 455/33.2 |
| 5,402,470 | 3/1995 | Devaney | 455/33.1 |
| 5,497,424 | 3/1996 | Vanderpool | 455/33.2 |
| 5,570,367 | 10/1996 | Ayanoglu et al. | 455/89 |

FOREIGN PATENT DOCUMENTS 62-120130 5/1987 Japan .

OTHER PUBLICATIONS

Performance of MMSE Linear Equalizer and Decision Feedback Equalizer in Single Frequency Simulcast Environment, 43rd IEEE Vehicular Technology Conference, Jan. 1993, pp., 629–632.

Multitransmitter Digital Signal Transmission by Using Offset Frequency Strategy in Land–Mobile Telephone, IEEE Transactions on Vehicular Technology, vol. VT–27, No. 4, Nov. 1978, pp. 231–238.

*Primary Examiner*—Donnie L. Crosland
*Attorney, Agent, or Firm*—Oblon, Spivak, McClelland, Maier & Neustadt, P.C.

[57] ABSTRACT

Centralized controlling apparatus controls overall flow of signals. Calling apparatus transmits a call signal in response to a call instruction signal transmitted from the centralized controlling apparatus. Information receiving apparatus receives the call signal to transmit an answer signal. Answer receiving apparatus transmits an answer acknowledge signal when it receives the answer signal. The centralized controlling apparatus transmits an information/control signal to information transmitting/distributing apparatus when it receives the answer acknowledge signal. The information transmitting/distributing apparatus distributes the information/control signals to a plurality of information transmitting apparatus. The plurality of information transmitting apparatus transmits simultaneously the information signals to the information receiving apparatus by radio.

20 Claims, 20 Drawing Sheets

HIGH-SPEED RADIO COMMUNICATION SYSTEM

TECHNICAL FIELD

The present invention relates to a high-speed radio communication system suitable for mobile communication.

BACKGROUND ART

Conventionally, as a radio communication system to transmit information from a radio base station to terminals, there is a radio paging system (so-called pocket-bell service system) shown in FIG. 1. A detailed configuration of the radio paging system shown in FIG. 1 has been set forth in, for instance, a literature, Masaaki Sinji, "Mobile Communication", Maruzen Co., Ltd, 1989.

First, a person who puts through a call (caller) issues a call request via the fixed telephone, etc. Once the call request has been issued, a call signal is transmitted from a calling base station 103 to a radio call receiving station 105 to effect a calling.

This radio paging system is a one-way transmission system and therefore only down transmission from the radio base station to the receiving terminal is carried out. Therefore, since transmitting function is not needed for the reception terminal, miniaturization/low consumption power of the reception terminal can be achieved. As mentioned above, the radio paging system is a one-way transmission system. However, the radio paging system can be used as an equivalent two-way communication system if it is combined with the fixed telephone which is connected to the cable public telephone (switched) network, for example, and therefore such radio paging system has been widely used.

Further, in order to improve receiving quality in the radio paging system, a multistation simultaneous transmission has been effected by transmitting simultaneously signals from a plurality of radio base stations to a certain terminal to attain a diversity effect.

In such multistation simultaneous transmission, offset transmission is often employed wherein carrier frequency, modulation waveform, or frequency deviation is offset intentionally in the radio base station. In case this offset transmission is employed, fading frequency of the signal received by the receiving terminal is accelerated rather than that obtained when the offset transmission is not employed. As a result, probability that a receiving level is less than that required for achieving normal transmission quality can be lessened to thus improve transmission characteristics. This fact has been disclosed, for example, in the above literature "Mobile Communication".

However, in this offset transmission, there has been such a drawback that expansion of required signal bandwidth is caused due to offset to reduce frequency utilization efficiency.

Therefore, as the multistation simultaneous transmission without expansion of the signal bandwidth, such a system has been examined that delayed symbol timings are transmitted intentionally between a plurality of radio base stations on the transmitter side and then these delayed waves are synthesized by an equalizer in the receiving terminal on the receiver side. In the case of this system, a so-called path diversity effect can be obtained because propagation paths from respective radio base stations to terminals can be considered to be independent. This fact has been set forth in patent application Ser. No.62-120130, entitled "Transmission Path Diversity Transmission System", and patent application Ser. No.2-148935, entitled "Diversity Receiver", and also disclosed in Per-Erik Ostling, "Performance of MMSE Linear Equalizer and Decision Feedback Equalizer in Single-Frequency Simulcast Environment", 43rd IEEE Vehicular Technology Conference, 1993, pp.629–632.

However, foregoing literatures merely disclose transmission systems, but no concrete transmission system including particular procedures to access radio channels, etc. have been proposed.

In addition, since transmission rate of the current radio paging system is 1.2 Kbit/sec at maximum, it is not feasible to transmit a great deal of information at high speed. Further, a transmission bandwidth must be expanded at the time of high-speed transmission of information. Since reception sensitivity is degraded owing to such expansion of the bandwidth rather than that obtained at the time of low speed transmission of the signal within a narrow bandwidth. In order to maintain reception sensitivity, transmission power which is larger than that required at the time of the low speed transmission of the signal within a narrow bandwidth has to be applied.

Particularly, detailed contents are given below. In other words, as shown in FIG. 2A, assuming that the like modulation system is utilized, the signal bandwidth is expanded at high-speed transmission compared with that required for low-speed transmission. For instance, as shown in FIG. 2A, if the transmission rate of the signal with the bandwidth $B_0$ is increased twice, the bandwidth $B_1$ becomes $B_1=2B_0$. At this time, as shown in FIG. 2B, after the signal has been passed through a receiving filter, increase of the signal bandwidth by two times results in increase of thermal noise power by two times as it is. Therefore, as shown in FIG. 2B, assuming that respective signal powers $S_0$ and $S_1$ is equal to each other, a SN ratio is degraded as it is if thermal noise power is increased twice. In this case, in order to acquire the similar SN ratio even after the signal has been passed through the receiving filter, signal transmission power must be increased twice. For purposes of example, if the transmission rate 1.2 Kbit/s used in current radio paging system is enhanced to 1.2 Mbit/s, transmission power is needed 1000 times. Hence, it is difficult to practice such system.

Like the above, if high-speed transmission with the wide bandwidth would be carried out by the configuration analogous to that used at low-speed transmission with the narrow bandwidth, deterioration in receiving quality is caused. Therefore, it would be evident that a high-speed information transmitting system cannot be realized by simply accelerating the transmission rate of the conventional radio paging system.

Similarly, although in the above literatures only a technique for synthesizing the signals by the equalizer in multistation simultaneous transmission has been mentioned, no particular configuration and operation of a concrete system utilizing such technique has been disclosed evidently.

DISCLOSURE OF INVENTION

The present invention has been made in view of the above problems, and an objection of the present invention is to provide a high-speed radio communication system capable of transmitting a great deal of information with good quality at high speed.

In order to attain the above object, the present invention provides a high-speed radio communication system comprising centralized controlling means for controlling flow of signals, calling means for transmitting a call signal in response to a call instruction signal transmitted from the centralized controlling means, information receiving means for receiving the call signal output from the calling means to transmit an answer signal, answer receiving means for receiving the answer signal output from the information receiving means to transmit an answer acknowledge signal, and information transmitting means for receiving an information/control signal transmitted from the centralized controlling means in response to the answer acknowledge signal output from the answer receiving means, and for transmitting an information signal carrying a large amount of information at high speed rather than said call signal to said information receiving means by radio.

More particularly, in the present invention, the centralized controlling means controls flow of overall signals. The calling means transmits the call signal in response to the call instruction signal transmitted from the centralized controlling means. The information receiving means receives the call signal output from said calling means and transmits the answer signal to the answer receiving means. The answer receiving means transmits the answer acknowledge signal to the centralized controlling means when it receives the answer signal. The centralized controlling means transmits the information/control signal to the information transmitting means when it receives the answer acknowledge signal. The information transmitting means transmits to the information receiving means the information signal carrying a great deal of information at high speed compared with those of the call signal by radio.

In addition, the present invention provides a high-speed radio communication system comprising centralized controlling means for controlling flow of signals, calling means for transmitting a call signal in response to a call instruction signal transmitted from the centralized controlling means, information receiving means for receiving the call signal output from the calling means to transmit an answer signal, answer receiving means for receiving the answer signal output from the information receiving means to transmit an answer acknowledge signal, information transmitting/distributing means for distributing information/control signals transmitted from the centralized controlling means in response to the answer acknowledge signal output from the answer receiving means, and a plurality of information transmitting means for transmitting information signals out of the information/control signals transmitted via the information transmitting/distributing means to the information receiving means by radio.

More particularly, in the present invention, the centralized controlling means controls flow of overall signals. The calling means transmits the call signal in response to the call instruction signal transmitted from the centralized controlling means. The information receiving means receives the call signal and transmits the answer signal to the answer receiving means. The answer receiving means transmits the answer acknowledge signal to the centralized controlling means when it receives the answer signal. The centralized controlling means transmits the information/control signals to the information transmitting/distributing means when it receives the answer acknowledge signal. The information transmitting/distributing means distributes the information/control signals to the plurality of information transmitting means. The plurality of information transmitting means transmit the information signals to the information receiving means by radio.

In the preferred embodiment of the present invention, the call signal and the answer signal are transmitted by radio.

More particularly, if the centralized controlling means and the calling means/the answer receiving means are connected by radio, these signals are transmitted by radio.

In the preferred embodiment of the present invention, the calling means transmits the call signal to a broad zone, while the answer receiving means receives the answer signal from a narrow zone.

More particularly, the zone associated with the calling means is wider than that associated with the answer receiving means.

In the preferred embodiment of the present invention, respective frames of the information signals transmitted respectively from a plurality of the information receiving means are synchronized with each other.

In the preferred embodiment of the present invention, the information receiving means includes equalizing means for equalizing the information signals transmitted respectively from a plurality of the information transmitting means.

In the preferred embodiment of the present invention, the centralized controlling means includes radio base station selecting means for estimating location of the information receiving means from location of the answer signal receiving means which has transmitted the answer acknowledge signal, and for selecting plural information transmitting means out of a plurality of the information transmitting means, from which the information signals are to be transmitted, in response to the location estimated.

In the preferred embodiment of the present invention, the information receiving means includes a first antenna for receiving the call signal, and a second antenna for receiving the information signals, and reception sensitivity of said second antenna is increased compared with that of the first antenna.

More particularly, the information signals can be received by the second antenna with good sensitivity.

In the preferred embodiment of the present invention, one antenna is shared with the first antenna and the second antenna by changing its configuration so as to change its sensitivity.

In the preferred embodiment of the present invention, the information receiving means decides whether or not the information signal of good quality has been received, and transmits a signal requesting retransmission of the information signals concerned to the centralized controlling means if not, and the centralized controlling means retransmits the information signal to the information transmitting means if it has received the signal.

In the preferred embodiment of the present invention, the information receiving means transmits a decision result that the information signal of good quality has been received or not to the centralized controlling means, and the centralized controlling means retransmits the information signal to the information transmitting means if it decides based on the decision result received that the information signal has not been received.

More particularly, the information receiving means transmits the decision result without condition, and the centralized controlling means decides whether or not the information signals should be retransmitted.

In the preferred embodiment of the present invention, the information receiving means includes reception completion informing means for transmitting a reception completion signal to the information transmitting means after reception of the information signal has been completed.

In the preferred embodiment of the present invention, the information transmitting means spontaneously terminates a series of operations required for information transmission unless it has received a retransmission request within a predetermined time interval after transmission of the information signal.

In the preferred embodiment of the present invention, each of the plurality of information transmitting means includes information signal delay controlling means for delaying the information signals based on a delay amount decided every information transmitting means.

In the preferred embodiment of the present invention, upon assigning delay amounts, the information signal delay controlling means assigns an equal delay amount to the information transmitting means which are separated by a predetermined distance.

In the preferred embodiment of the present invention, the information transmitting means transmits the information signals in compliance with a spread spectrum modulation system, and the information receiving means utilizes a RAKE receiver.

As mentioned above, in the present invention, first the call signal is transmitted to the receiving terminal via the low-speed communication network, then the answer signal transmitted from the receiving terminal is confirmed, and then a single or a plurality of information transmitting means simultaneously transmit information at higher speed.

In addition, in the present invention, the information signals are transmitted simultaneously from a plurality of information transmitting means to the receiving terminal through the same carrier frequency.

The present invention is different from the prior art in respect that the call signal and the answer signal are transmitted via the low-speed communication network while the information signals are transmitted via the high-speed communication network.

The present invention is different from the prior art in respects that the transmission rate of the information signals are accelerated and the equalizing means is employed so as to correspond to such acceleration and that delay times between the information signal transmitting means are adjusted so as to operate the equalizing means effectively. In the present invention, unlike the radio paging system, the call request signal, etc. are not employed, and the information signals are transmitted irrespective of the request signal and the information receiving means can always receive the information signals.

BEST MODE FOR CARRYING OUT THE INVENTION

Embodiments of the present invention will be explained with reference with accompanying drawings hereinafter.

Figure 1:
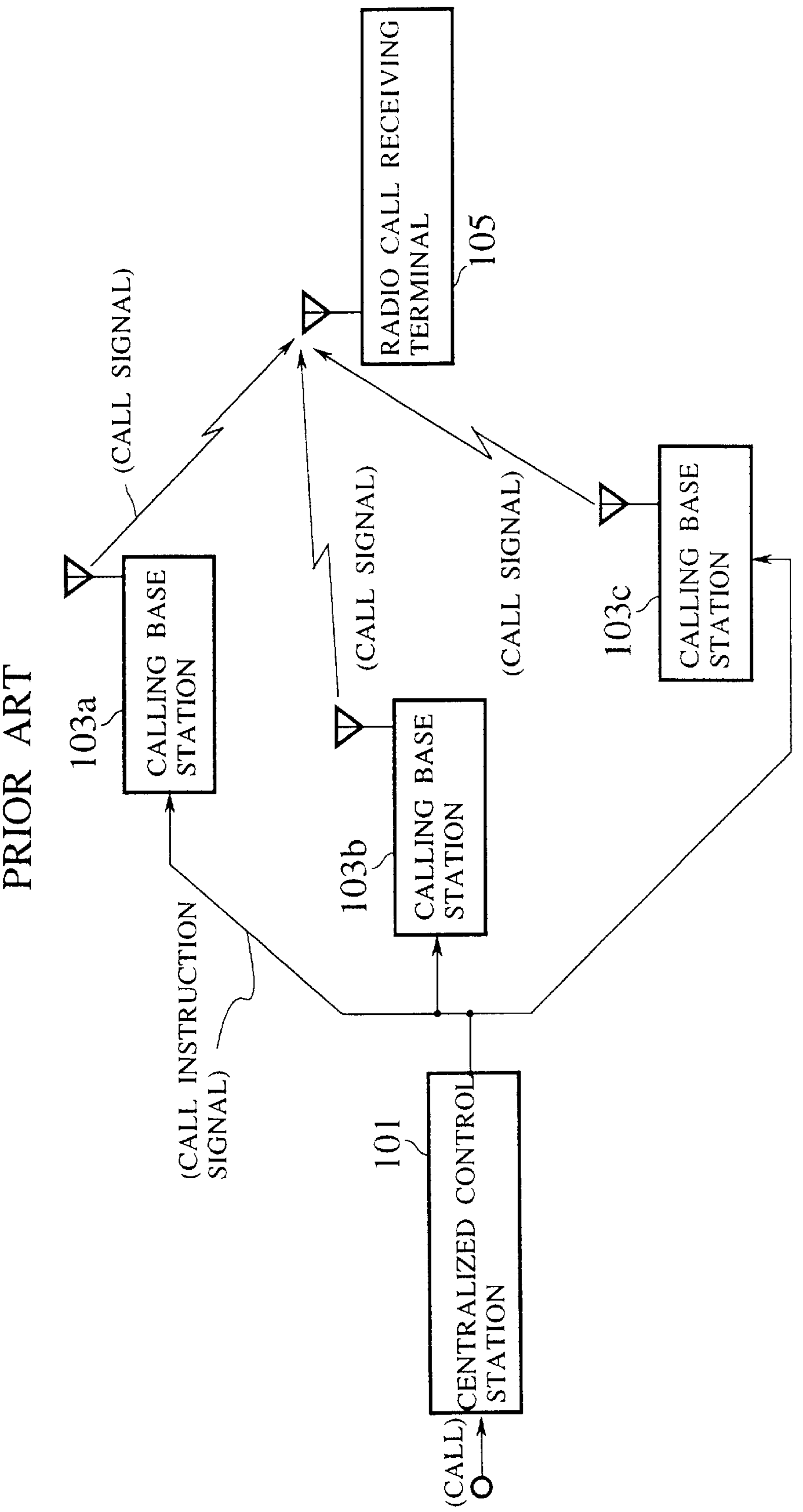
FIG. 1 is a block diagram showing an example of configuration in the prior art.
Figure 2A:
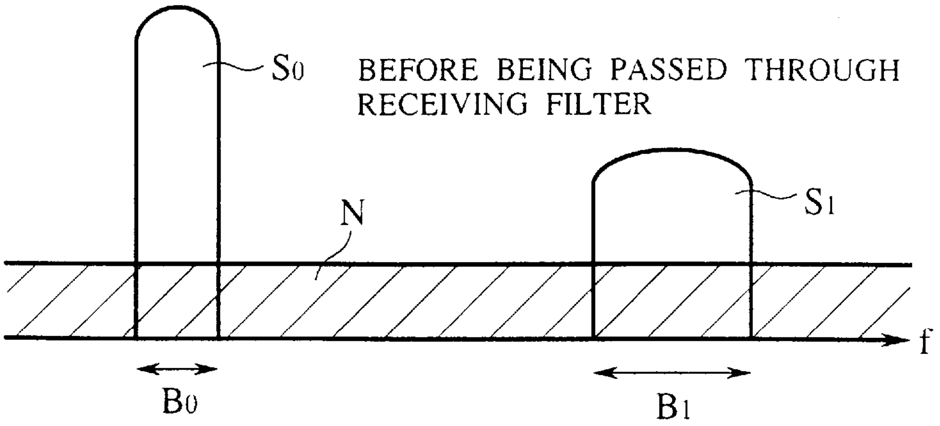
FIGS. 2A and 2B are views illustrating the case where transmission rate is increased as it is in the prior art.
Figure 2B:
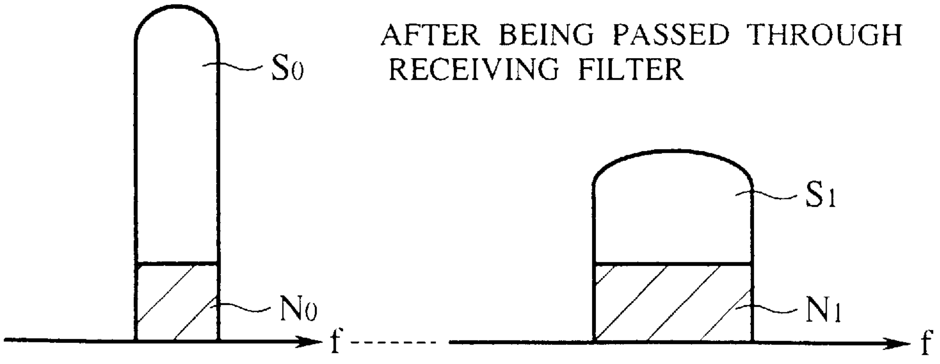
Figure 3:
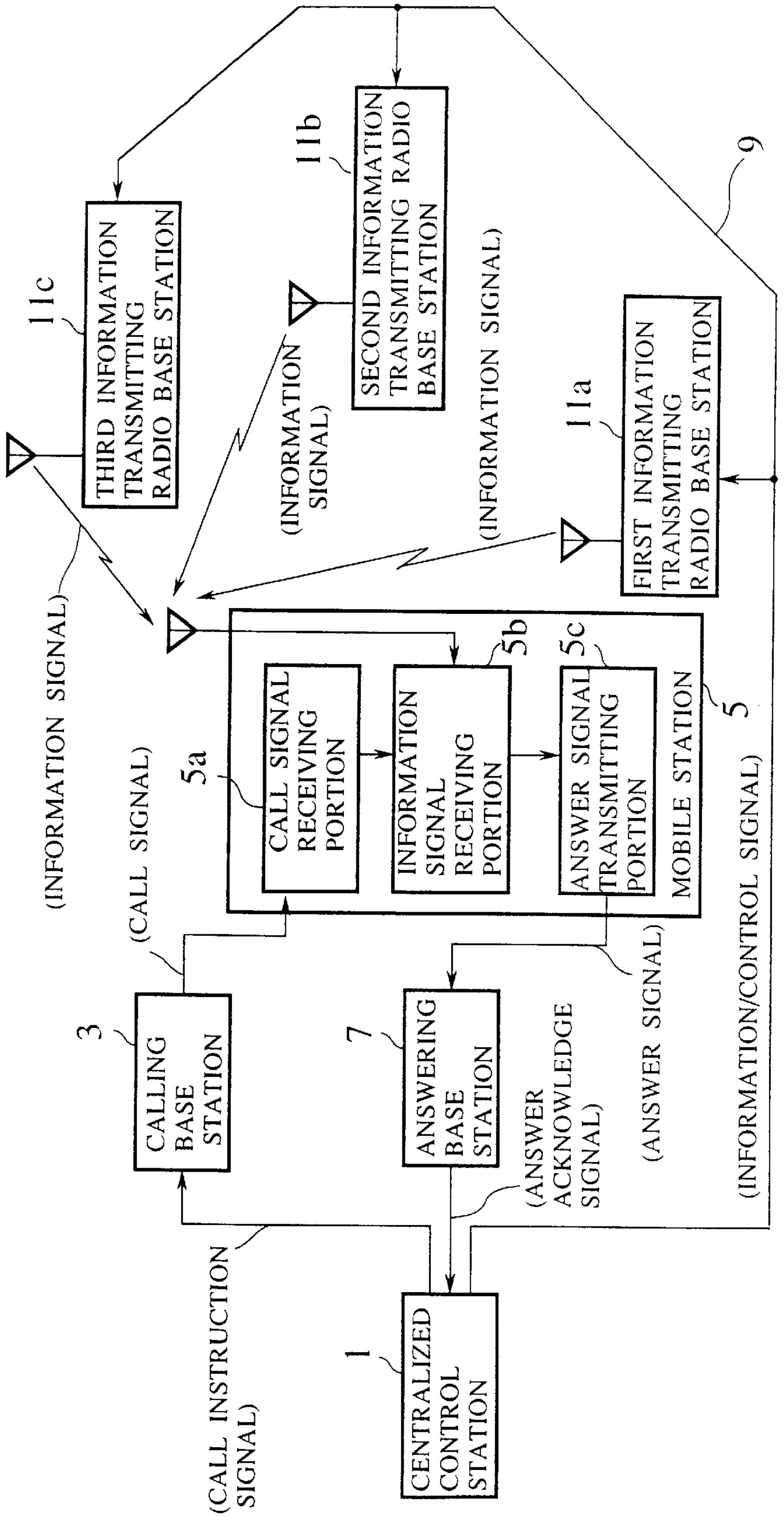
FIG. 3 is a block diagram showing a configuration of a high-speed radio communication system to realize a first embodiment according to a high-speed radio communication system of the present invention.

FIG. 3 is a block diagram showing a configuration of a high-speed radio communication system to realize a first embodiment according to a high-speed radio communication system of the present invention.

A high-speed radio communication system according to present embodiment comprises a centralized control station 1, a calling base station 3, a mobile station 5, an answering base station 7, an information transmitting network 9 and a plurality of information transmitting radio base stations 11.

The centralized control station 1, the calling base station 3, the mobile station 5, the answering base station 7, the information transmitting network 9, and the plurality of information transmitting radio base stations 11 correspond respectively to centralized controlling means, calling means, information receiving means, answer receiving means, information transmitting/distributing means, and information transmitting means.

The mobile station 5 consists of a call signal receiving portion 5*a*, an information signal receiving portion 5*b*, and an answer signal transmitting portion 5*c*. The plurality of information transmitting radio base stations 11 are provided in the service area so that the service area can be covered entirely. In FIG. 3, for purposes of example, as the plurality of information transmitting radio base stations 11, a system consisting of a first information transmitting radio base station 11*a* (MS1), a second information transmitting radio base station 11*b* (MS2), and a third information transmitting radio base station 11*c* (MS3) is depicted.

Figure 4:
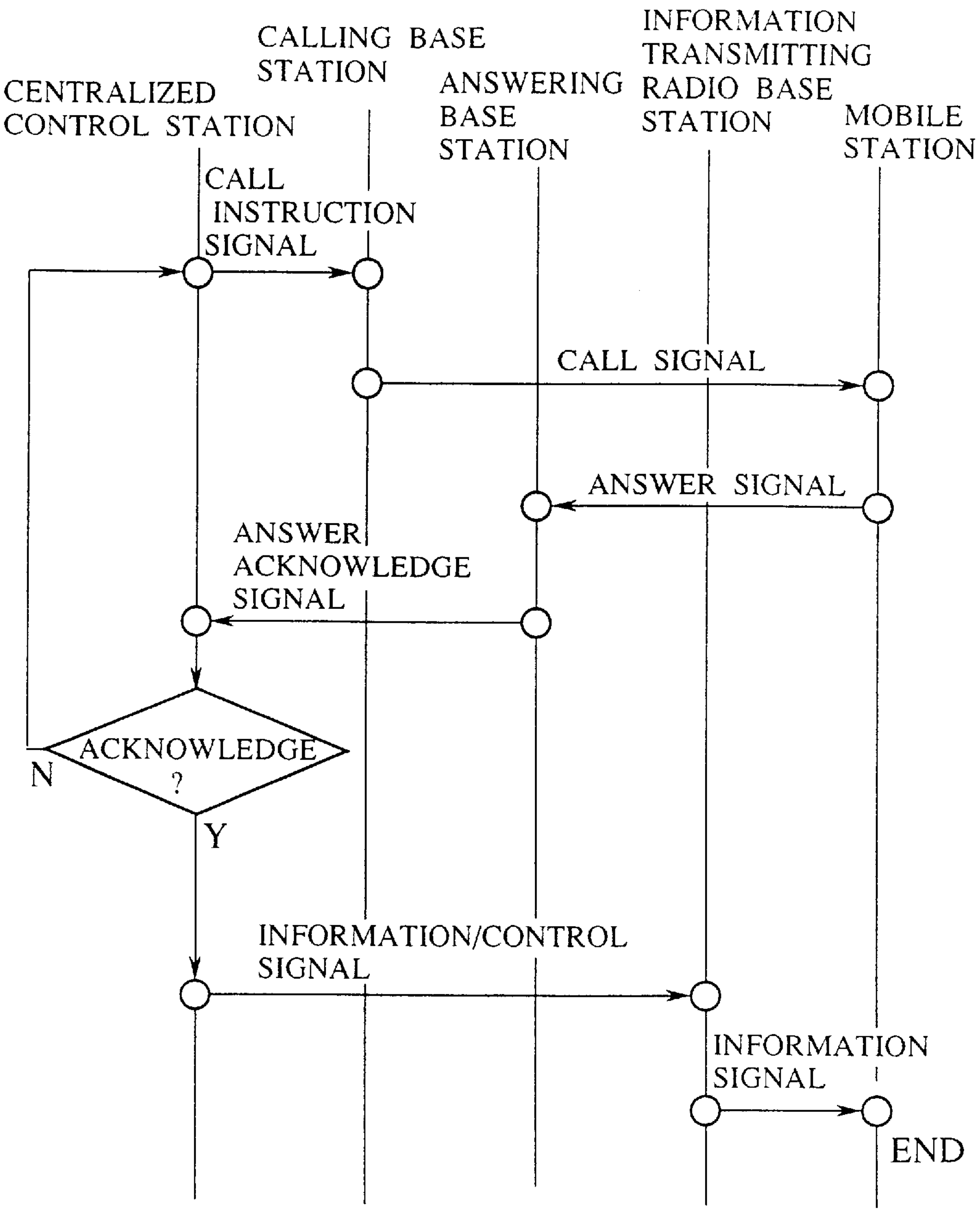
FIG. 4 is an operating flowchart illustrating flow of signals in the high-speed radio communication system to realize the first embodiment.

FIG. 4 is an operating flowchart illustrating flow of signals in the high-speed radio communication system to realize the first embodiment.

Referring to FIGS. 3 and 4, operations and functions of this high-speed radio communication system will be explained. The centralized control station 1 controls overall flow of all signals. The centralized control station 1 transmits the call instruction signal to the calling base station 3 by cable. The calling base station 3 transmits the call signal to the mobile station 5 when receiving the call instruction signal.

Figure 5A:
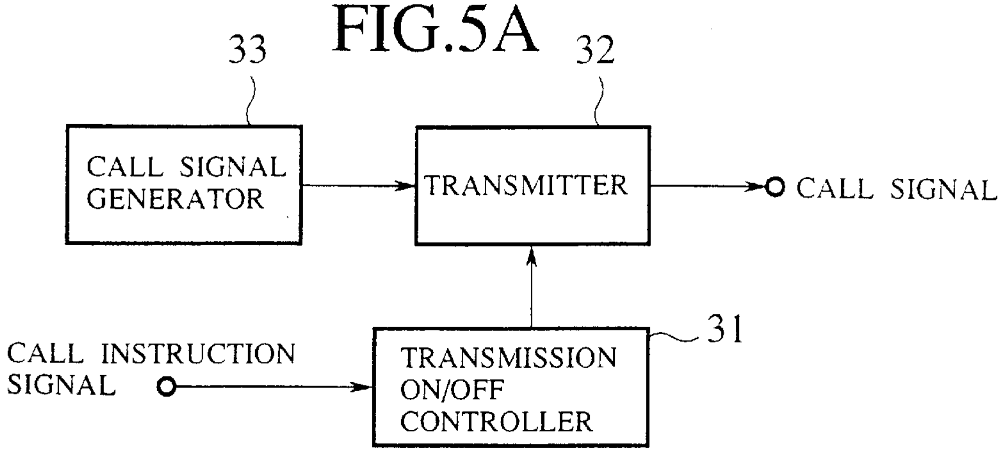
FIG. 5A is a block diagram showing an example of a configuration of a calling base station.

In FIG. 5A, a block diagram showing an example of a configuration of the particular calling base station 3 is depicted. The call instruction signal transmitted from the centralized control station 1 is input into a transmission on/off controller 31. The transmission on/off controller 31, when received the call instruction signal, provides a transmission-on instruction to a transmitter 32. When receiving the transmission-on instruction, the transmitter 32 transmits the call signal which is generated by a call signal generator 33. As in an embodiment described later, if the call signal is transmitted by radio, the call signal will be transmitted via an antenna.

Figure 6A:
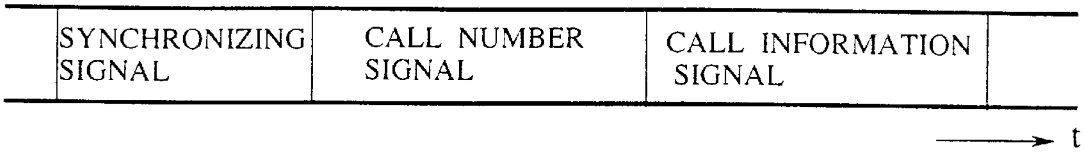
FIG. 6A is a view showing an example of a call signal.

FIG. 6A shows an example of the call signal. In this instance, the call signal comprises a synchronizing signal, a call number signal, and a call information signal. The synchronizing signal is used to accomplish synchronization on the receiver side. The call number signal is a signal indicating the number of the mobile station to be called. The call information signal is a signal indicating the contents of the information signals which are transmitted from the information transmitting radio base stations 11 after the answer acknowledge signal has been issued. By referring to this call information signal, the mobile station 5 is able to determine whether or not the information signals should be received.

The call signal supplied from the call base station 3 is received by the call signal receiving portion 5*a* in the mobile station 5. At this time, the mobile station 5 is in a stand-by state to wait for the call signal, and only the call signal receiving portion 5*a* is active. For this reason, power consumption can be reduced in this stand-by state. To inform the centralized control station 1 of the fact that the call signal has been received, the mobile station 5 operates the answer signal transmitting portion 5*c* to transmit the answer signal to the answering base station 7. At the same time, the mobile station 5 operates the information signal receiving portion 5*b* to permit reception of the information signal.

Figure 5B:
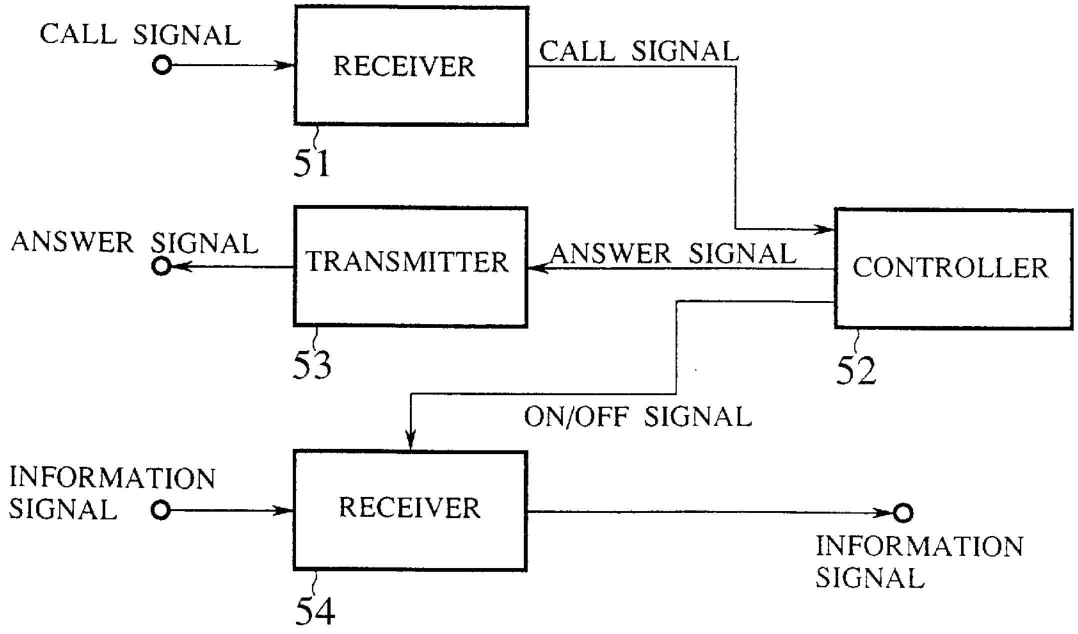
FIG. 5B is a block diagram showing an example of a configuration of a mobile station.

In FIG. 5B, a block diagram showing an example of a configuration of the particular mobile station 5 is shown. Here the call signal transmitted from the calling base station 3 is received by a receiver 51 and then transferred to a controller 52. The answer signal from the controller 52 is transmitted via a transmitter 53. The controller 52 transmits an on/off signal to a receiver 54 in response to the contents of the call information signal out of the call signal to turn on or off the receiver 54 which is caused to receive the information signals from the information transmitting radio base station or not to receive the information signals. Like an embodiment described later, in case transmission/reception between the calling base station 3 and the answering base station 7 is effected by radio, such transmission/reception may be carried out via one antenna. The call signal receiving portion 5*a* is composed of the receiver 51 and the controller 52. The answer signal transmitting portion 5*c* is composed of the transmitter 53 and the controller 52. In addition, the information signal receiving portion 5*b* is composed of the receiver 54 and the controller 52.

Figure 6B:
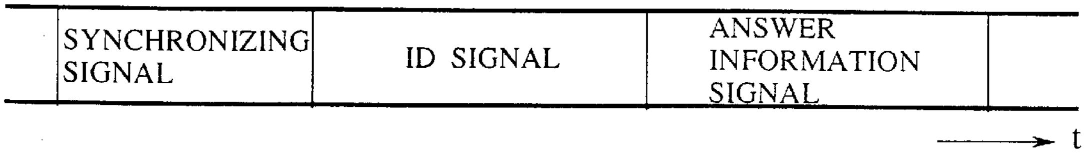
FIG. 6B is a view showing an example of an answer signal.

FIG. 6B shows an example of the answer signal. In this instance, the call signal comprises the synchronizing signal, an ID signal, and an answer information signal. The synchronizing signal is used to accomplish synchronization on the receiver side. The ID signal is a signal indicating the number of the mobile station which has put through a call. The answer information signal is a signal indicating information to be attached to the answer acknowledge signal. By referring to this answer information signal, the centralized control station 1 is able to determine whether or not such information signals should be transmitted.

The answering base station 7 transmits the answer acknowledge signal to the centralized control station 1 if it has received the answer signal.

Figure 5C:
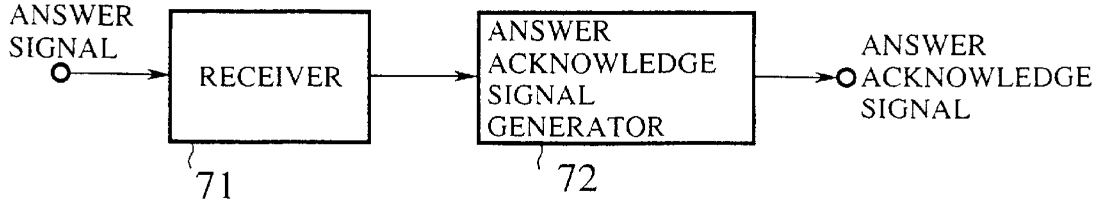
FIG. 5C is a block diagram showing an example of a configuration of an answering base station.

In FIG. 5C, a block diagram showing an example of a configuration of the particular answering base station is given. Where the answer signal from the mobile station 5 is received by a receiver 71. When the answer signal has been received by the receiver 71, an answer acknowledge signal generator 72 transmits the answer acknowledge signal to the centralized control station 1. As in an embodiment described later, if the answer signal is received by radio, it is received via the antenna.

The centralized control station 1 which has received the answer acknowledge signal transmits the information/control signals to respective information transmitting radio base stations 11*a*, 11*b*, 11*c* via the information transmitting network 9 if reception of the call signal has been confirmed by the mobile station. The information signal to be transmitted to the mobile station 5 and the control signal to control the information transmitting radio base stations 11 are included in the information/ control signal. In the present invention, identical information signals are transmitted to the information transmitting radio base stations 11*a*, 11*b*, 11*c*.

Figure 6C:
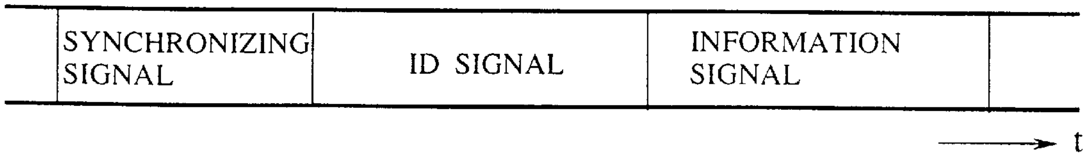
FIG. 6C is a view showing an example of an information signal.

FIG. 6C shows an example of the information signal. In this instance, the information signal comprises the synchronizing signal, the ID signal, and an information signal. The synchronizing signal is used to accomplish synchronization on the receiver side. The ID signal is a signal indicating the number of the mobile station which has made a call. The information signal is a signal indicating the contents of information which are to be transmitted actually to the mobile station.

The centralized control station 1 transmits again the call instruction signal to the calling base station 3 unless reception of the call signal has been confirmed by the mobile station.

When the information/control signal has been transmitted from the centralized control station 1, respective information transmitting radio base stations 11a, 11b, 11c transmit simultaneously the information signals to the mobile station 5 at high transmission rate by radio. With the above operations, the mobile station 5 can receive a large amount of information at high speed.

In the present embodiment, the call signal and the answer signal are transmitted at low transmission speed, but the information signals are transmitted at high speed. The call signal and the answer signal carry less information amount, and thus they are not needed to be transmitted via the high-speed communication network. Since the receiver for receiving high-speed signals needs a high operation clock frequency, generally it needs large consumption power compared with that in the receiver for receiving low-speed signals. Hence, if the call signal is also transmitted at high speed, power consumption is increased while the mobile station waits for the call signal. On the contrary, in the present embodiment, because the call signal is transmitted at low-speed, power consumption can be suppressed to be small in stand-by state to receive the call signal.

In the above mentioned system, synchronization is required between base stations since the information signals are transmitted simultaneously from a plurality of base stations. Nevertheless, synchronization can be achieved with high precision if the plurality of base stations are synchronized with each other by virtue of the GPS (Global Positioning System) signal. Although the GPS has been developed as a satellite for military purposes, it can also be utilized for private purposes, for example, in a navigation system which indicates locations of the moving vehicles. Although the GPS signal has been mainly utilized to know locations of objects, time can also be known with precision within 1 $\mu$s from the world standard time based on the GPS signal. For this reason, it is possible to accomplish high precision synchronization by setting time by the GPS signal.

In the system of the present embodiment, errors in carrier frequency for carrying the information signals between the base stations arise as a problem, nevertheless such errors can be solved by installing rubidium atom oscillators with high frequency stability in respective base stations.

Besides, even though a crystal oscillator is utilized, it is feasible to obtain frequency stability equivalent to that of the rubidium atom oscillator if errors are compensated for by the GPS signal. By installing such crystal oscillators in respective base stations, the base stations can be constituted at a low cost rather than that required for the rubidium atom oscillator.

Figure 7:
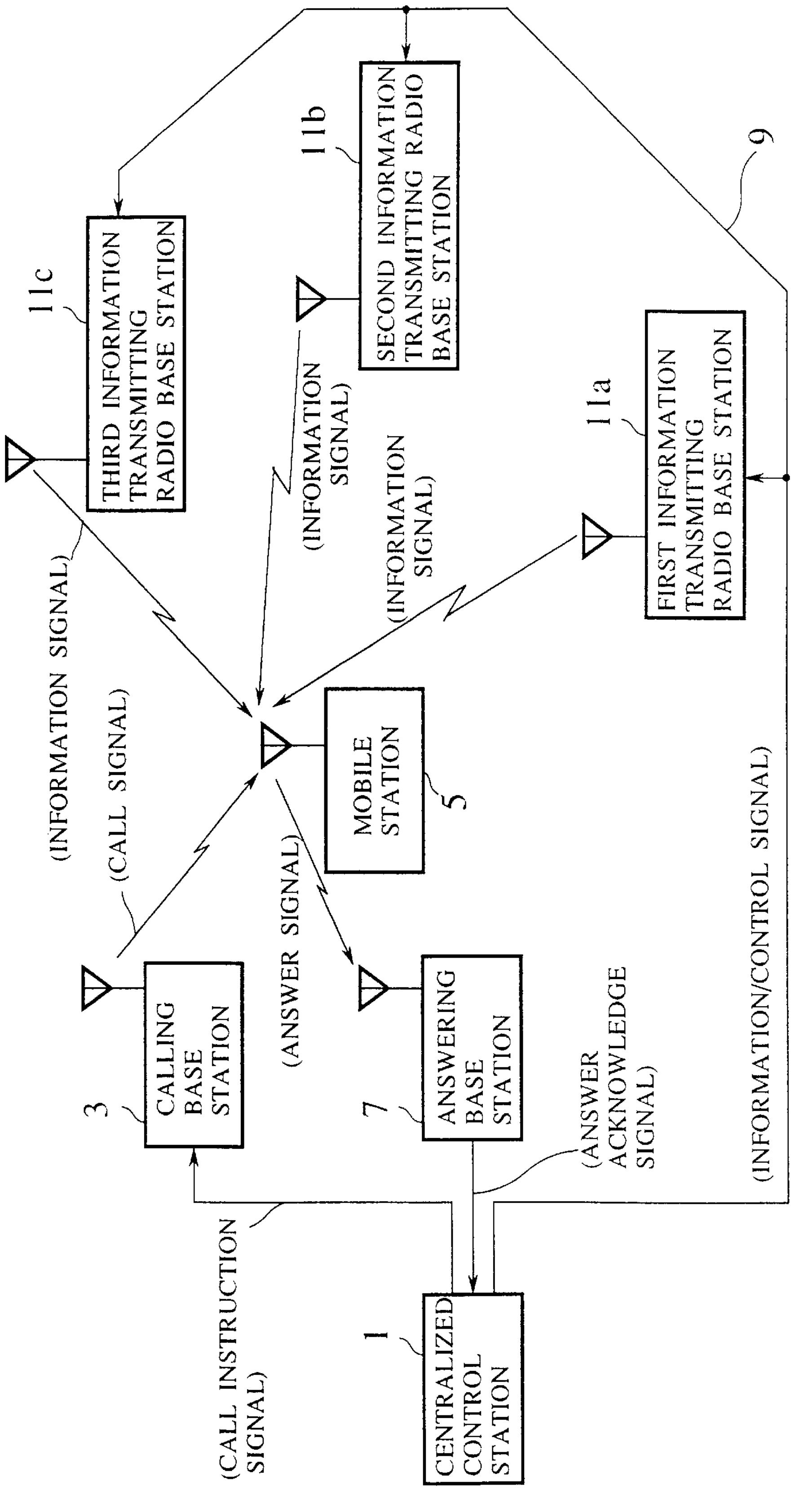
FIG. 7 is a block diagram showing a configuration of a high-speed radio communication system to realize a second embodiment according to the high-speed radio communication system of the present invention.

FIG. 7 is a block diagram showing a configuration of a high-speed radio communication system to realize a second embodiment according to the high-speed radio communication system of the present invention.

In this second embodiment, the call signal and the answer signal are transmitted respectively by radio. In other words, the call signal receiving portion 5a and the answer signal transmitting portion 5c in the mobile station 5 are equipped with a common antenna or respective antennas for radio communication. Likewise, the calling base station 3 and the answering base station 7 have respective antennas. In order to provide service by the high-speed radio communication system according to the present embodiment over the entire service area, plural antennas are provided at appropriate distance respectively in the service area.

Since the call signal and the answer signal are transmitted respectively by radio in the present embodiment, the mobile station 5 need not be connected by the cable to form the network. As a result, the portable terminal for mobile communication can be employed as the mobile station 5. Furthermore, consumption of electric energy is limited because of the built-in battery when the mobile station 5 is used as the portable terminal. However, like the first embodiment mentioned earlier, it is possible to use the mobile station as the portable terminal more easily since in the second embodiment low power consumption can be attained in a stand-by state to receive the call signal.

Figure 8:
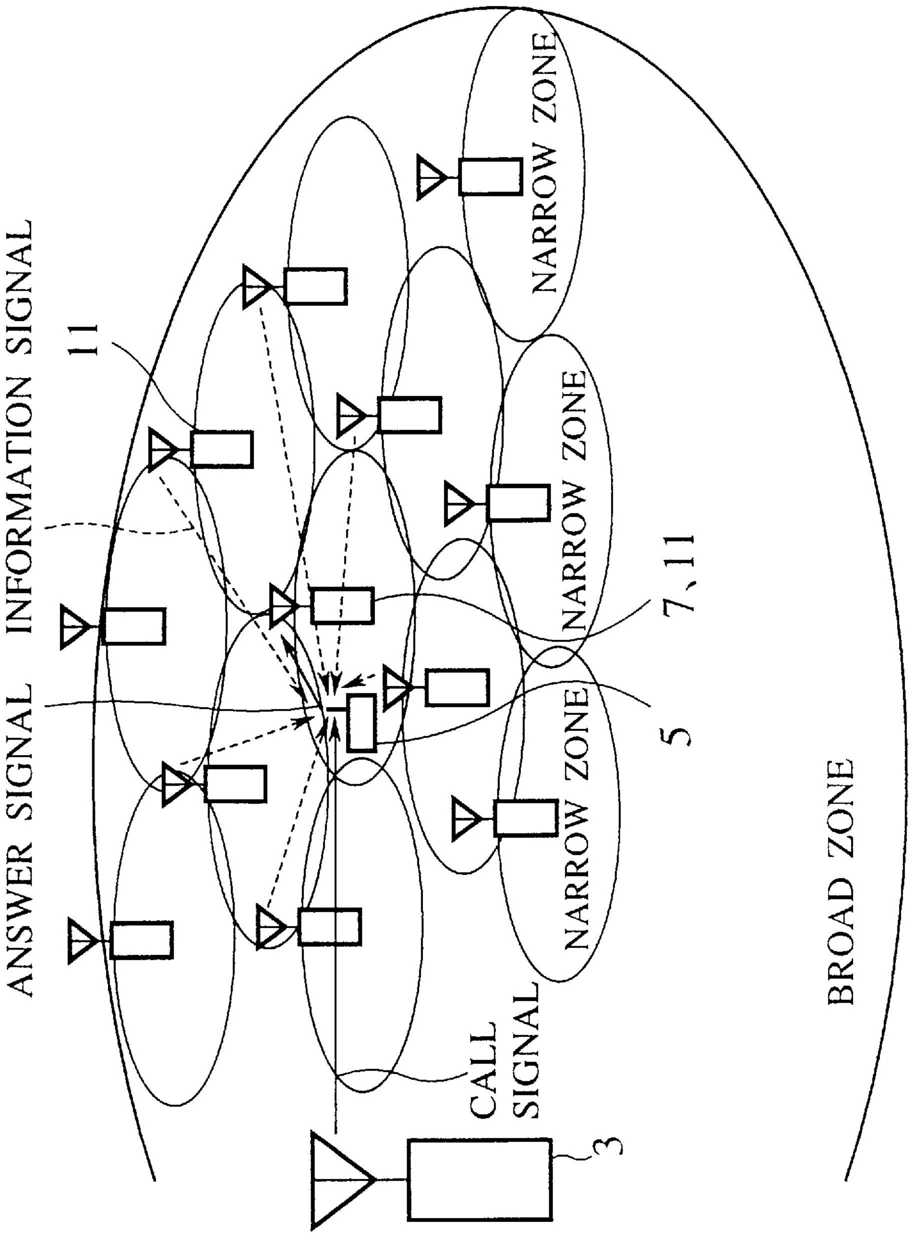
FIG. 8 is view showing an example where the call signal and the answer signal are transmitted by radio.

Referring to FIG. 8, an example will be explained where the call signal and the answer signal are transmitted by radio. In FIG. 8, the call signal is designed to be transmitted from the calling base station 3 to the very broad zone as in the current radio paging system, for example. On the contrary, the answering base station 7 for receiving the answer signal is designed to cover the narrower zone, like the current vehicle/portable telephone system. Registration of location of the mobile station 5 can be omitted by transmitting the call signal into the broad zone, which leads to simplification of the system. In addition, if the answering base stations 7 are allocated closely rather than the calling base stations 3 to receive the answer signal, transmission power required for transmitting the answer signal can be reduced, which leads to lower consumption power of the portable terminal.

Comparison between reception powers of the answer signal received by plural answering base stations 7 enables the system to estimate the location of the mobile station 5.

As an application of the present embodiment, it can be considered that the current radio paging system will be used as the calling base station 3 while the current vehicle/portable telephone system will be used as the answering base station 7.

Next, a third embodiment according to the high-speed radio communication system of the present invention will be explained hereinbelow.

In the third embodiment, in order to facilitate synthesis of the information signals which are transmitted from a plurality of base stations to the mobile station 5, frame synchronization is used between the information transmitting radio base stations 11a, 11b, 11c to transmit the information signals. Since the information transmitting radio base stations 11a, 11b, 11c are connected via the information transmission network 9, it is easy to synchronize frame timing frequency and clock timing frequency based on a common clock. However, if lengths of trunk lines connected to the information transmitting radio base stations 11a, 11b, 11c are not constant, e.g., if circuitous routes of the trunk lines are taken for maintenance's sake, phases of these timings may be varied. In such case, variation in timing within several clock timings is permitted in frame timing phase to achieve a quasi-synchronization state.

Figure 9:
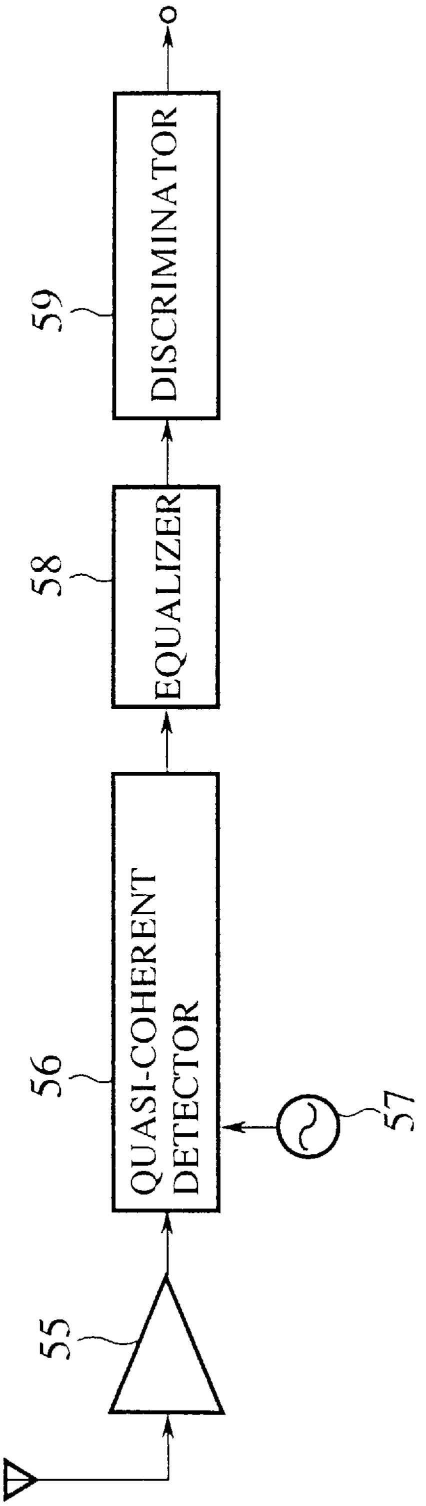
FIG. 9 is a block diagram showing a fourth embodiment according to the high-speed radio communication system of the present invention.

FIG. 9 is a block diagram showing a fourth embodiment according to the high-speed radio communication system of the present invention.

This fourth embodiment shows the case where an equalizing means is provided for the information signal receiving portion 5b of the mobile station 5 to receive the information signals satisfactorily even if delays are caused between the information signals transmitted respectively from the information transmitting radio base stations 11a, 11b, 11c. The information signal receiving portion 5b comprises an amplifier 55, a quasi-coherent detector 56, an oscillator 57, an equalizer 58, and a discriminator 59. The information signal is detected by the quasi-coherent detector 56, then equalized by the equalizer 58, and then symbol decision of the signal is made by the discriminator 59.

The equalizer 58 serves to equalize the signals which are delayed on the propagation paths by a so-called multi-path fading. Even if the same information signals are transmitted from the information transmitting radio base stations 11_a_, 11_b_, 11_c_, the reception signals are similar to those being subjected to the multi-path fading when delays are caused between these information signals. In other word, since the reception signals are the same signals delayed and then added, inter-symbol interference is caused to degrade transmission characteristics. Since the equalizer functions to remove influence of this inter-symbol interference, the mobile station 5 may receive the information signals satisfactorily even if there are delays between the base stations, as described above.

To cancel the inter-symbol interference, the equalizer 58 executes operations to select a signal at the highest level (principal wave) from the reception signals in which a large number of delayed waves are synthesized and then cancel other delayed waves at lower level by using the principal wave. For this reason, the equalizer 58 executes operations analogous to selective diversity in which the signal at the highest level is always selected to communicate. Since the propagation paths of the signals transmitted from the information transmitting radio base stations 11_a_, 11_b_, 11_c_ can be regarded as independent paths, a path diversity effect can be achieved by the equalizer on the receiver side to therefore improve the transmission characteristics.

This method is advantageous since such diversity effect can be achieved more surely by delaying the signals transmitted from the information transmitting radio base stations 11_a_, 11_b_, 11_c_ intentionally. Since the information transmitting radio base stations 11_a_, 11_b_, 11_c_ are connected via the information transmission network 9, it is feasible to control delay amounts between the information transmitting radio base stations 11_a_, 11_b_, 11_c_. In this embodiment, frequency utilization efficiency is never reduced because expansion of the bandwidth is not caused which appears in the conventional multistation simultaneous transmission.

Figure 10:
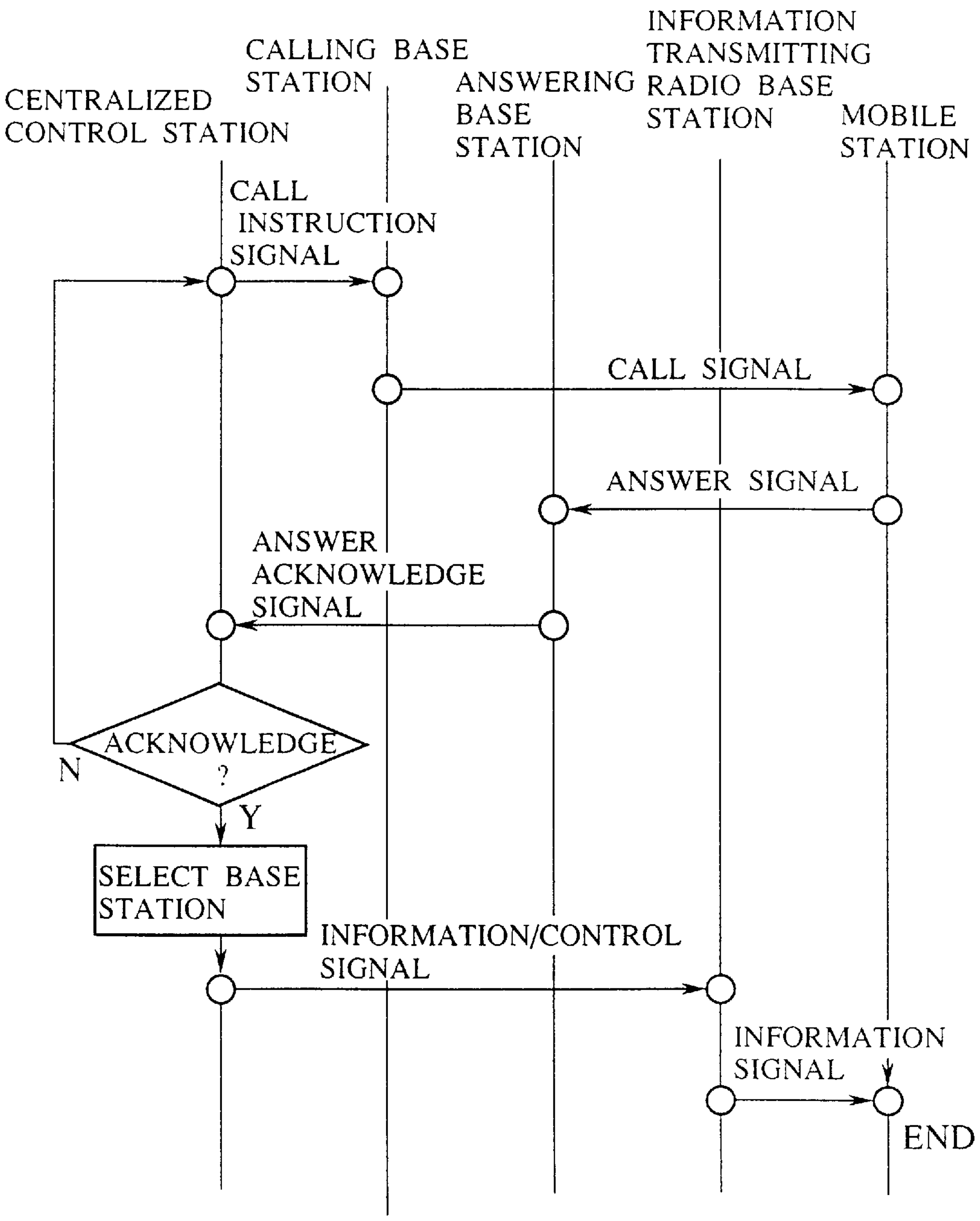
FIG. 10 is an operating flowchart illustrating flow of signals in a high-speed radio communication system to realize a fifth embodiment according to the high-speed radio communication system of the present invention.

Next, a fifth embodiment according to the high-speed radio communication system of the present invention will be explained. FIG. 10 is an operating flowchart illustrating flow of signals in the high-speed radio communication system to realize the fifth embodiment according to the high-speed radio communication system of the present invention.

In this fifth embodiment, the centralized control station 1 has selecting means for information transmitting radio base station. In other words, the centralized control station 1 estimates the location of the mobile station 5 based on the location of the answering base station 7 to transmit the answer acknowledge signal, and selects plural information transmitting radio base stations which transmit the information signals from a plurality of information transmitting radio base stations 11 in compliance with the estimated location.

Figure 11:
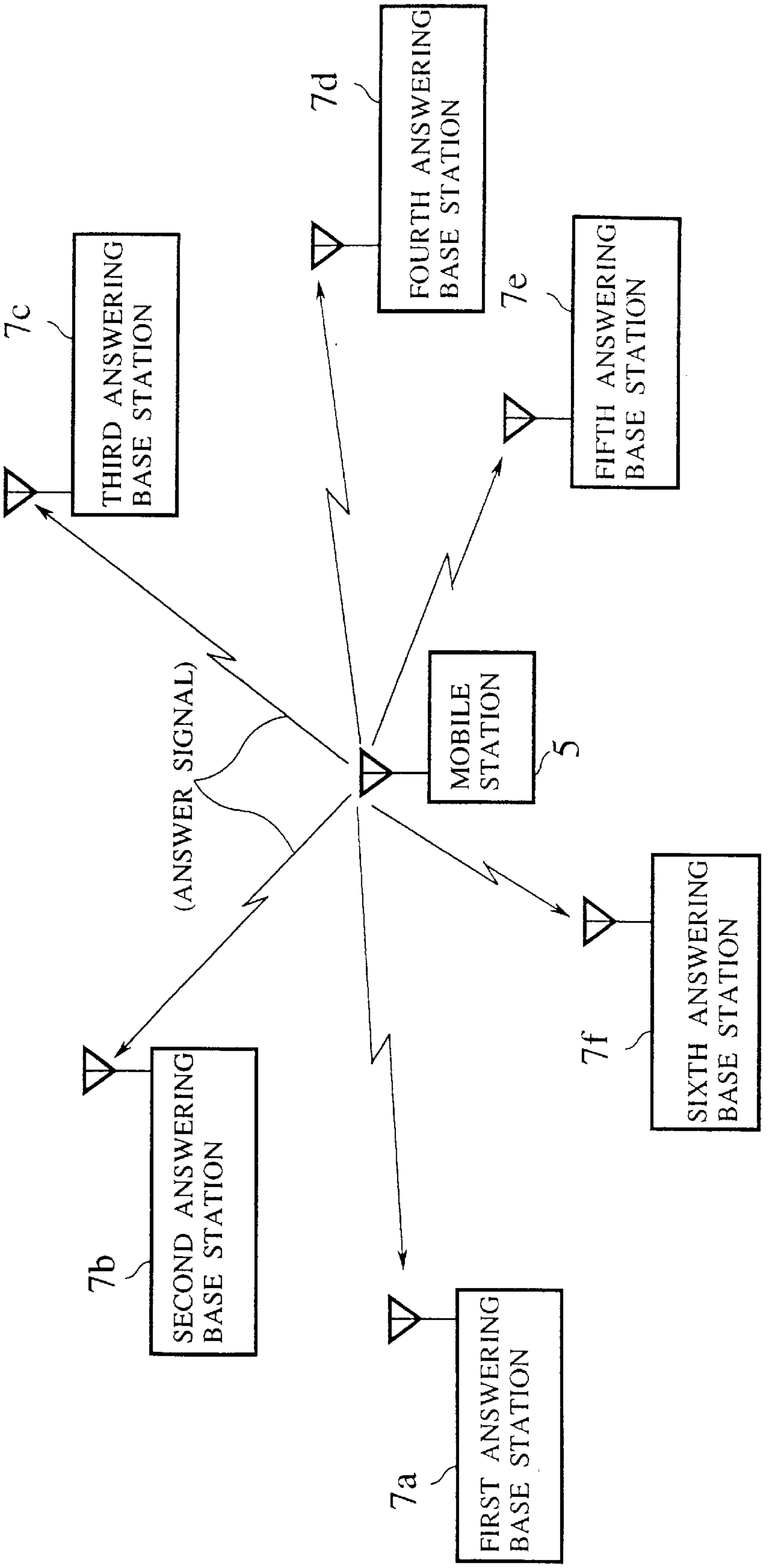
FIG. 11 is a block diagram showing the fifth embodiment.

In the present embodiment, like the current vehicle/portable telephone system, for example, it is assumed that a large number of the answering base stations 7 are allocated in the service area. Therefore, the location of the mobile station 5 can be estimated based on the location of the answering base station 7 to transmit the answer signal. In case the answer signals are transmitted by radio, the location of the mobile station 5 can be estimated by comparing reception levels between respective answering base stations 7. For instance, if the answering base stations 7_a_, . . . , 7_f_ are allocated as shown in FIG. 11, usually the answering base stations 7_f_ which locates nearest the mobile station 5 has the answer signal with highest average reception level. Thereby, it can be estimated that the mobile station 5 is near the answering base stations 7_f_.

In the present embodiment, a large number of the information transmitting radio base stations 11_a_, . . . are allocated so as to provide the service for the service area entirely. Hence, the information signals must be transmitted from all information transmitting radio base stations 11_a_, . . . unless the location is estimated, but the information signals transmitted from the information transmitting radio base stations 11_a_, . . . which are remote from the mobile station 5 are of no use since they cannot be received by the mobile station 5. On the other hand, if the information transmitting radio base stations 11_a_, . . . are to be selected, the information signal can be transmitted effectively because the information transmitting radio base stations 11_a_, . . . to transmit the information signals are limited. Assuming that the information transmitting radio base stations 11_a_, . . . may be designed to be selected, if different information are transmitted from the areas which are separated at a distance, such information can be transmitted even by the same frequency independently and simultaneously. That is, repetitive use of the frequency can be accomplished. To this end, frequency utilization efficiency of allover system can be improved.

Figure 12:
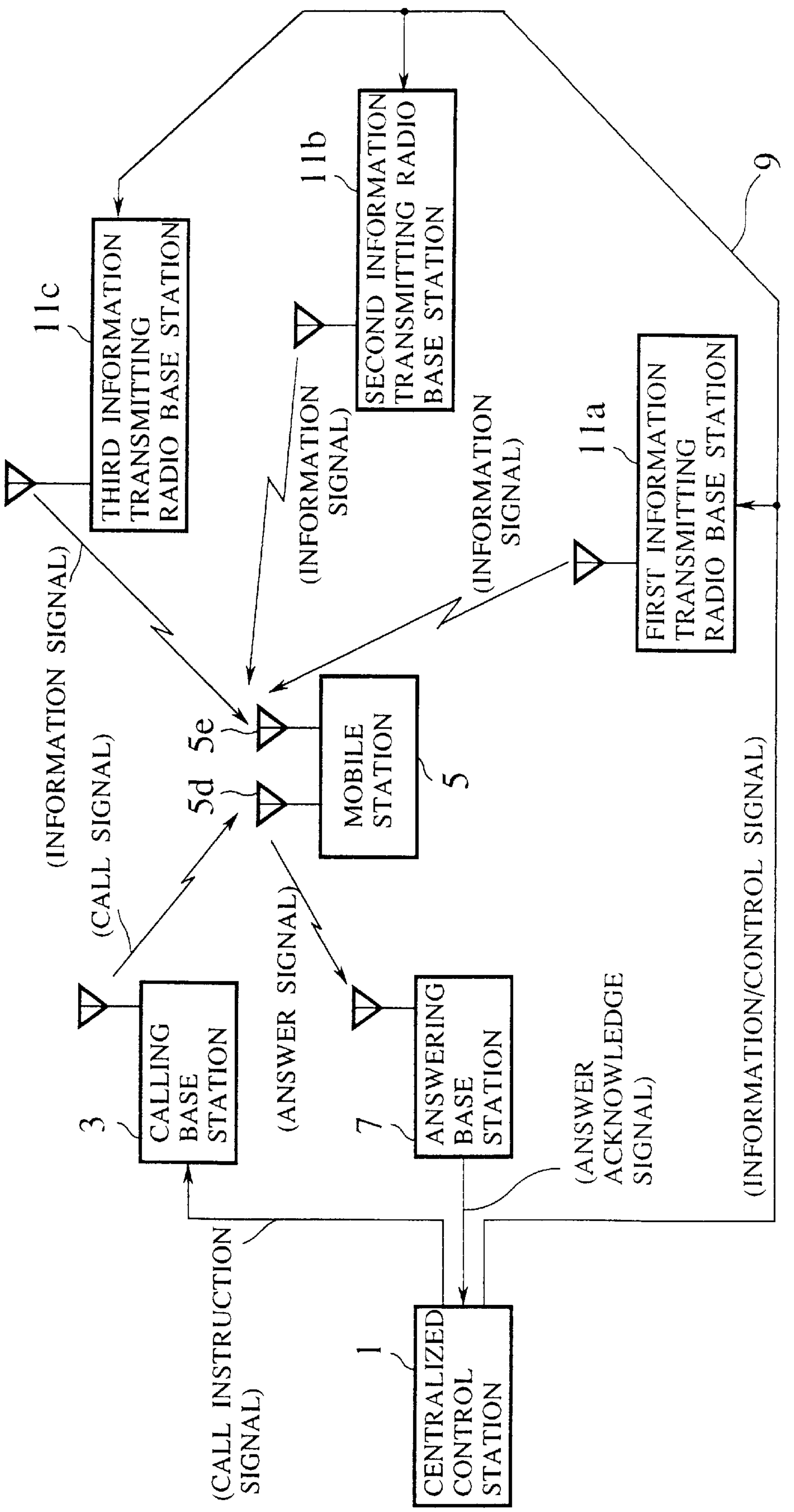
FIG. 12 is a block diagram showing a configuration of a high-speed radio communication system to realize a sixth embodiment according to the high-speed radio communication system of the present invention.

FIG. 12 is a block diagram showing a configuration of a high-speed radio communication system to realize a sixth embodiment according to the high-speed radio communication system of the present invention.

In this sixth embodiment, as shown in FIG. 12, the mobile station 5 has a first antenna 5_d_ for receiving the call signal, and a second antenna 5_e_ for receiving the information signal and having excellent reception sensitivity rather than the first antenna 5_d_. Since the call signal is a low-speed and narrow bandwidth signal whereas the information signal is a high-speed and wide bandwidth signal, reception sensitivity of the high-speed and wide bandwidth signal would be degraded in contrast to the low-speed and narrow bandwidth signal if they are transmitted with the same power. Consequently, if both signals are received by the same antenna, difference is caused in reception sensitivity. Therefore, in the present embodiment, the above problem can be solved by providing a dedicated antenna which is more sensitive and receives the information signal.

As an application example of the present embodiment, there is a method wherein one antenna is employed by changing its configuration. More particularly, the antenna is stored in the mobile station 5, for example, when receiving the call signal and then, after receiving the calling signal, sensitivity of the antenna is increased by changing its configuration of the antenna, e.g., by drawing the antenna out, to receive the information signal. This method becomes more effective if such change of the configuration can be confirmed. As a confirmation method, such a method can be considered that an acknowledge signal is affixed to the answer signal. Otherwise, another method can be considered that, after the answering base station 7 has received the answer signal, the centralized control station 1 transmits the information signal at a certain time interval so as to give the mobile station 5 a time used for changing the mode of the antenna, though not confirming the mode especially.

Figure 13:
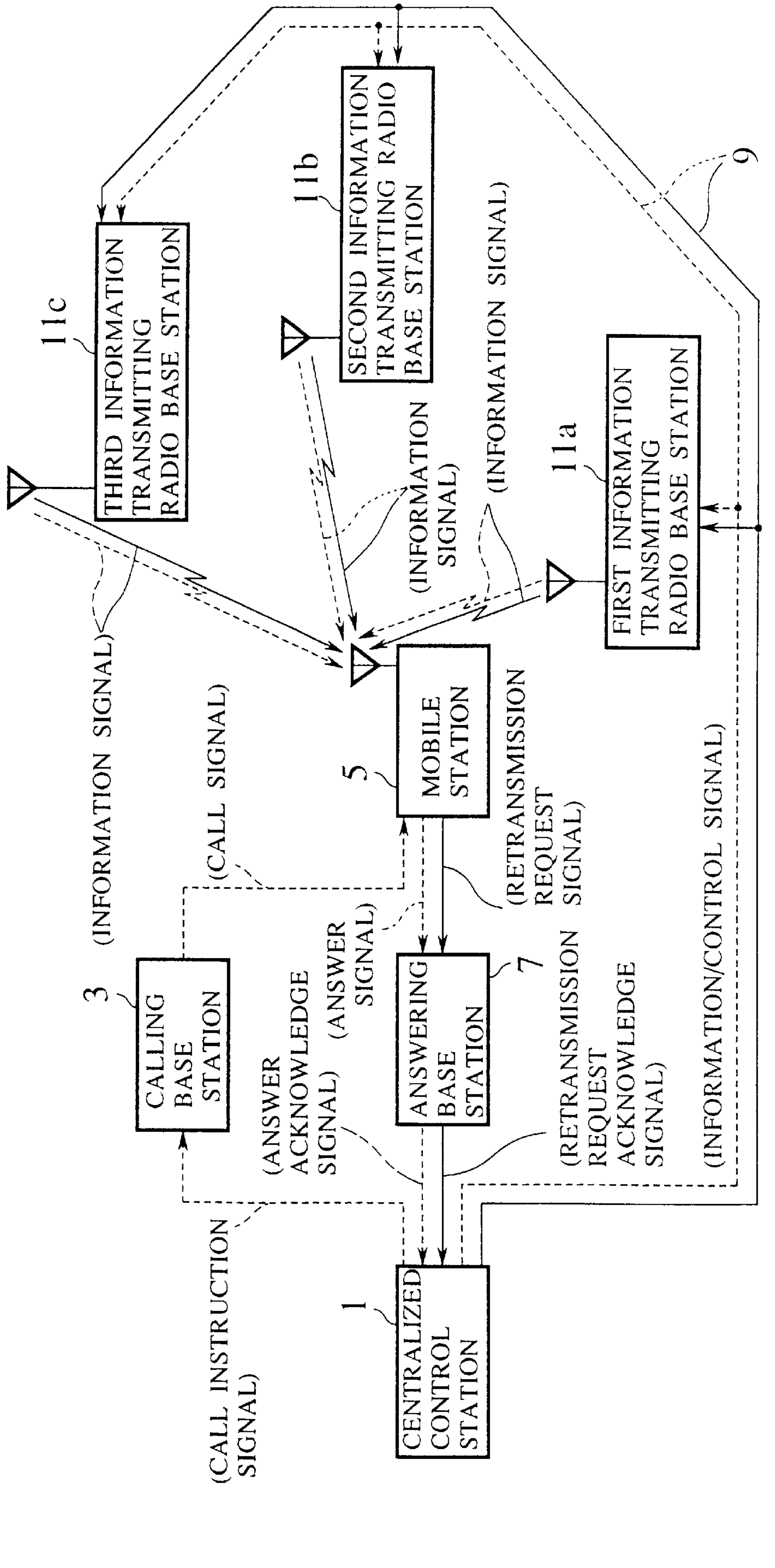
FIG. 13 is a block diagram showing a configuration of a high-speed radio communication system to realize a seventh embodiment according to the high-speed radio communication system of the present invention.

FIG. 13 is a block diagram showing a configuration of a high-speed radio communication system to realize a seventh embodiment according to the high-speed radio communication system of the present invention.

In the seventh embodiment, the mobile station 5 has retransmission request means which requests retransmission of the information signal by the information transmitting radio base station 11 when the information signal with sufficient quality has not received. In this high-speed radio communication system, it is supposed that the information signal will be transmitted by radio and thus in some cases sufficient quality cannot be obtained according to condition of the propagation path. In the present embodiment, unless sufficient quality can be obtained at the time of receiving the information signal, the mobile station 5 transmits a retransmission request signal to the answering base station 7 to request transmission of the information signal again. As the retransmission request means for transmitting the retransmission request signal, the answer signal transmitting portion 5*c* in the mobile station 5 shown in FIG. 3 can be utilized.

As an embodiment for requesting retransmission of the information signal, there are two methods as follows.

Figure 14:
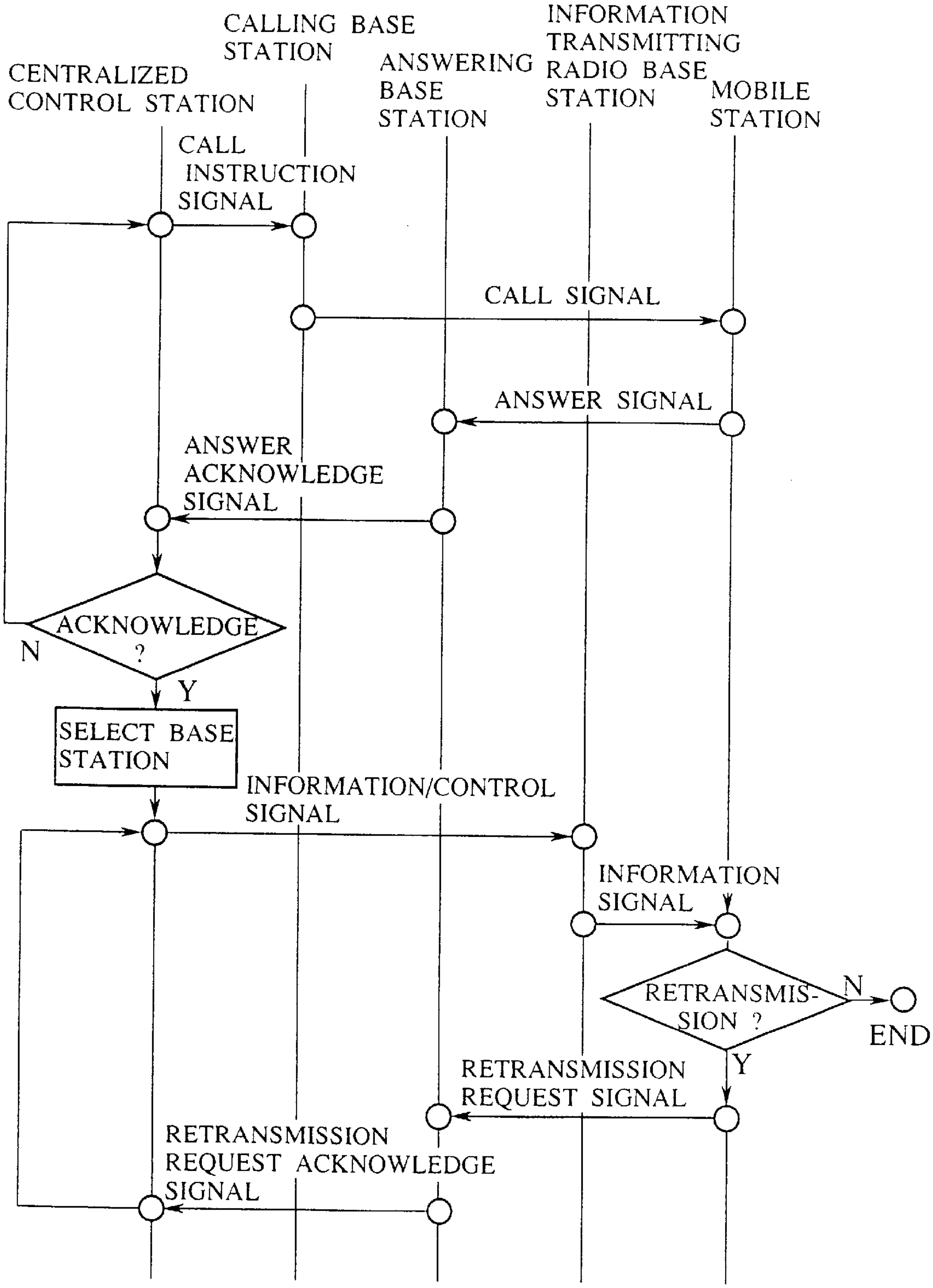
FIG. 14 is an operating flowchart illustrating a first method in the embodiment which requests retransmission of the information signal.

FIG. 14 is an operating flowchart illustrating a first method.

The mobile station 5 which receives the information signal for the first time determines whether or not the information signal has sufficient quality and transmits the retransmission request signal to the answering base station 7 if not. Once the answering base station 7 has received the retransmission request signal, it transmits to the centralized control station 1 a retransmission request acknowledge signal corresponding to the answer acknowledge signal for the first time transmission. The centralized control station 1, when receiving the retransmission request acknowledge signal, instructs the information transmitting radio base station 11 to transmit the information once more by transmitting the information/ control signal to the station 11 again. Responding to the signal, the information signal is transmitted from the information transmitting radio base station 11 once again.

Figure 15:
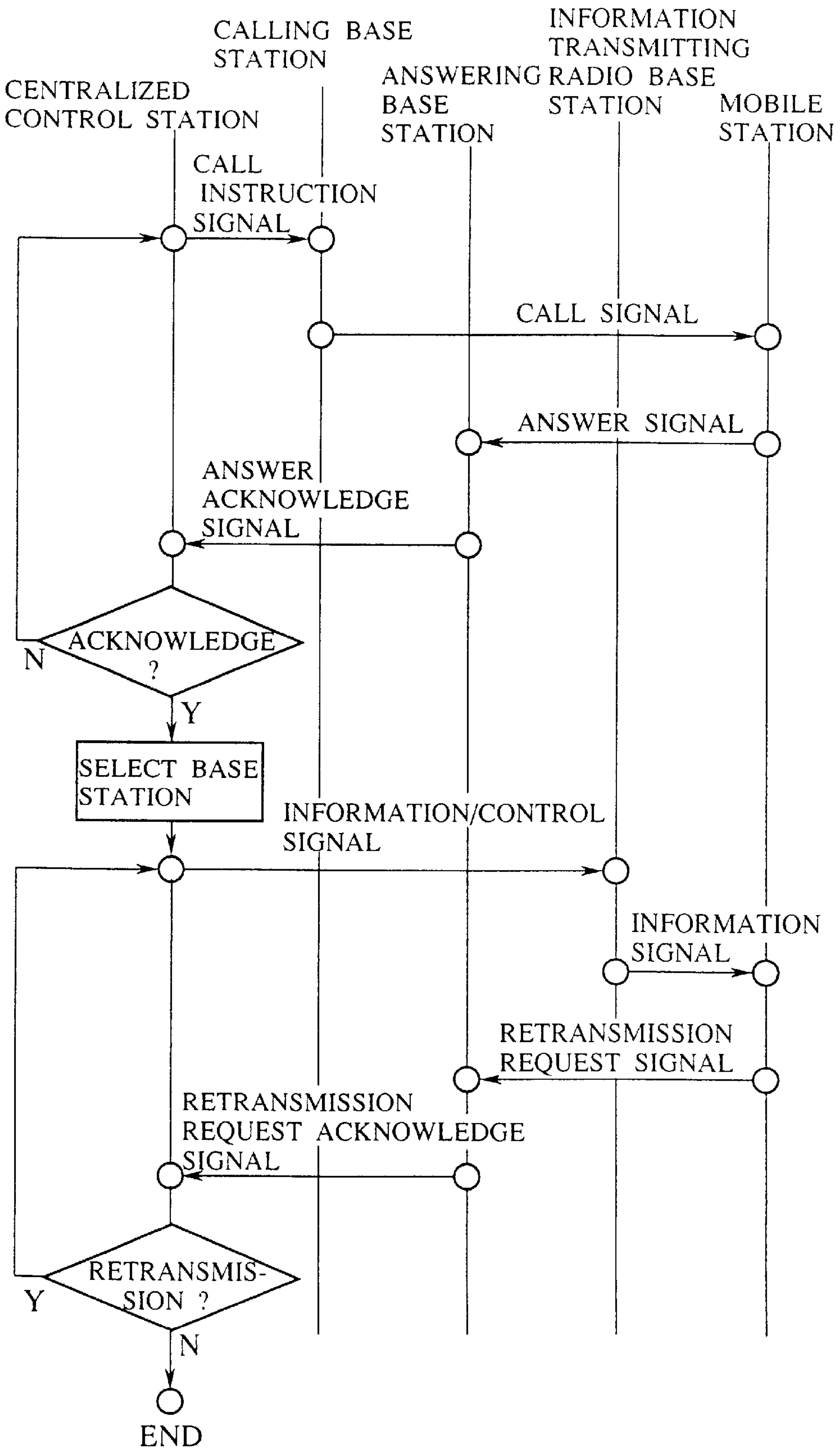
FIG. 15 is an operating flowchart illustrating a second method in the embodiment which requests retransmission of the information signal.

FIG. 15 is an operating flowchart illustrating a second method.

The second method is different from the first method in the following respect. That is, in the first method the mobile station 5 transmits the retransmission request signal only when the information signal received has insufficient quality while, in the second method, the mobile station 5 always determines whether or not the quality is insufficient and then transmits the decision results as the retransmission request signal irrespective of the contents of the decision results, and thus the centralized control station 1 retransmits the information/ control signal or does not retransmit the signal in accordance with the decision results.

In the above two methods, unless the retransmitted information signal has been received with sufficient quality, the above procedures would be repeated again. However, since the above procedures are repeated again and again if the propagation path is in very bad condition, it can be thought about that such procedures should be terminated after a certain number of times in practical use. With the above method, sufficient quality of the information signal will always be assured when the mobile station receives the information signal.

Subsequently, an eighth embodiment according to the high-speed radio communication system of the present invention will be explained.

In the eighth embodiment, the mobile station 5 has reception completion informing means for transmitting the reception completion signal to the information transmitting radio base station 11 after reception of the information signal has been terminated. Accordingly, if the information signal has been received with sufficient quality, the mobile station 5 will transmit the reception completion signal to the information transmitting radio base stations 11.

Associating with the seventh embodiment, such a method can be considered that, in place of transmitting the reception completion signal, the information transmitting radio base station 11 sets a certain time interval after transmission of the information, and then terminates automatically a series of operations concerning information transmission by itself unless it does not receive the retransmission request signal within the time interval.

Figure 16:
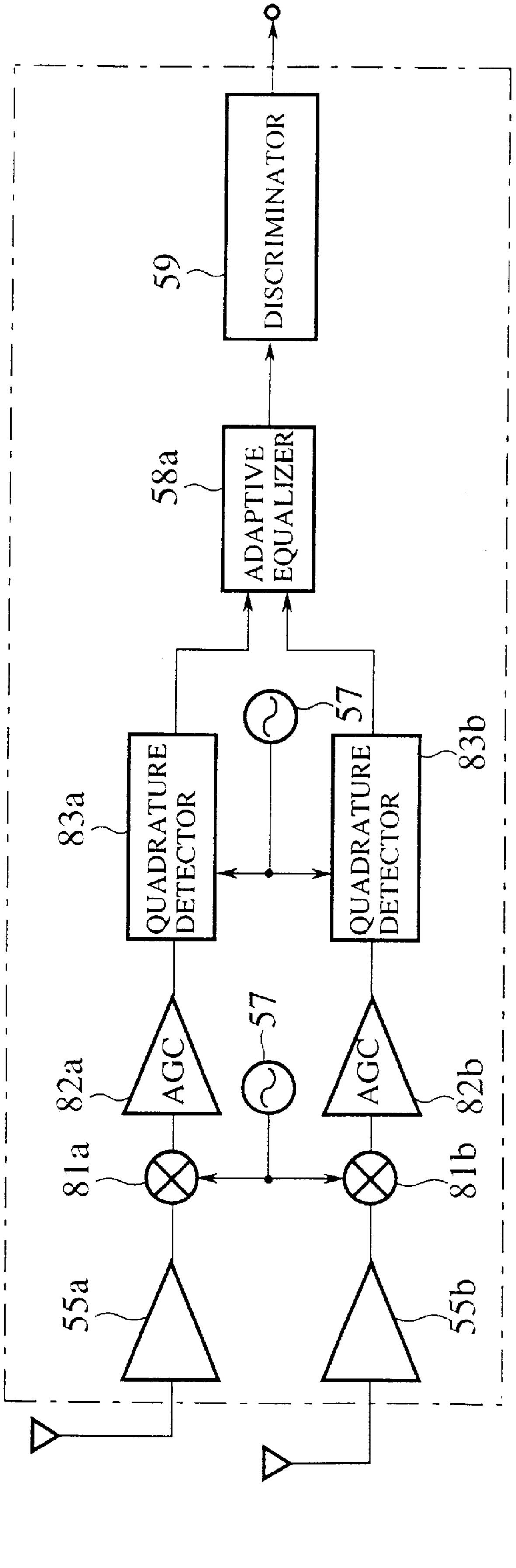
FIG. 16 is a block diagram showing a ninth embodiment according to the high-speed radio communication system of the present invention.

FIG. 16 is a block diagram showing a ninth embodiment according to the high-speed radio communication system of the present invention.

In the ninth embodiment, the information signal receiving portion 5*b* in the mobile station 5 is equipped with equalizing means which enables the mobile station 5 to receive the information signals satisfactorily even when there are caused delays between the information signals transmitted from the information transmitting radio base stations 11*a*, 11*b*, 11*c*. An example of configuration of the information signal receiving portion 5*b* is shown in FIG. 16. In FIG. 16, a configuration for effecting antenna diversity reception is given which comprises an AGC (Auto Gain Control) 82, a quadrature detector 83, an adaptive equalizer 58*a*, and a discriminator 59. Variation in reception level of the received signal due to fading, etc. is removed by the AGC 82 and then the received signal is detected by the quadrature detector 83. The detected signal is then equalized by the adaptive equalizer 58*a*, and symbol decision of the information signal is then performed by the discriminator 59. The adaptive equalizer 58*a* has a function to synthesize the signals which are delayed on respective propagation paths due to the so-called multi-path fading. If the mobile station 5 receives the same signals which are transmitted from respective information transmitting radio base stations 11 and have delays therebetween, the mobile station 5 can synthesize these information signals by using the adaptive equalizer 58*a* because the situation analogous to the multi-path fading is caused.

Figure 17:
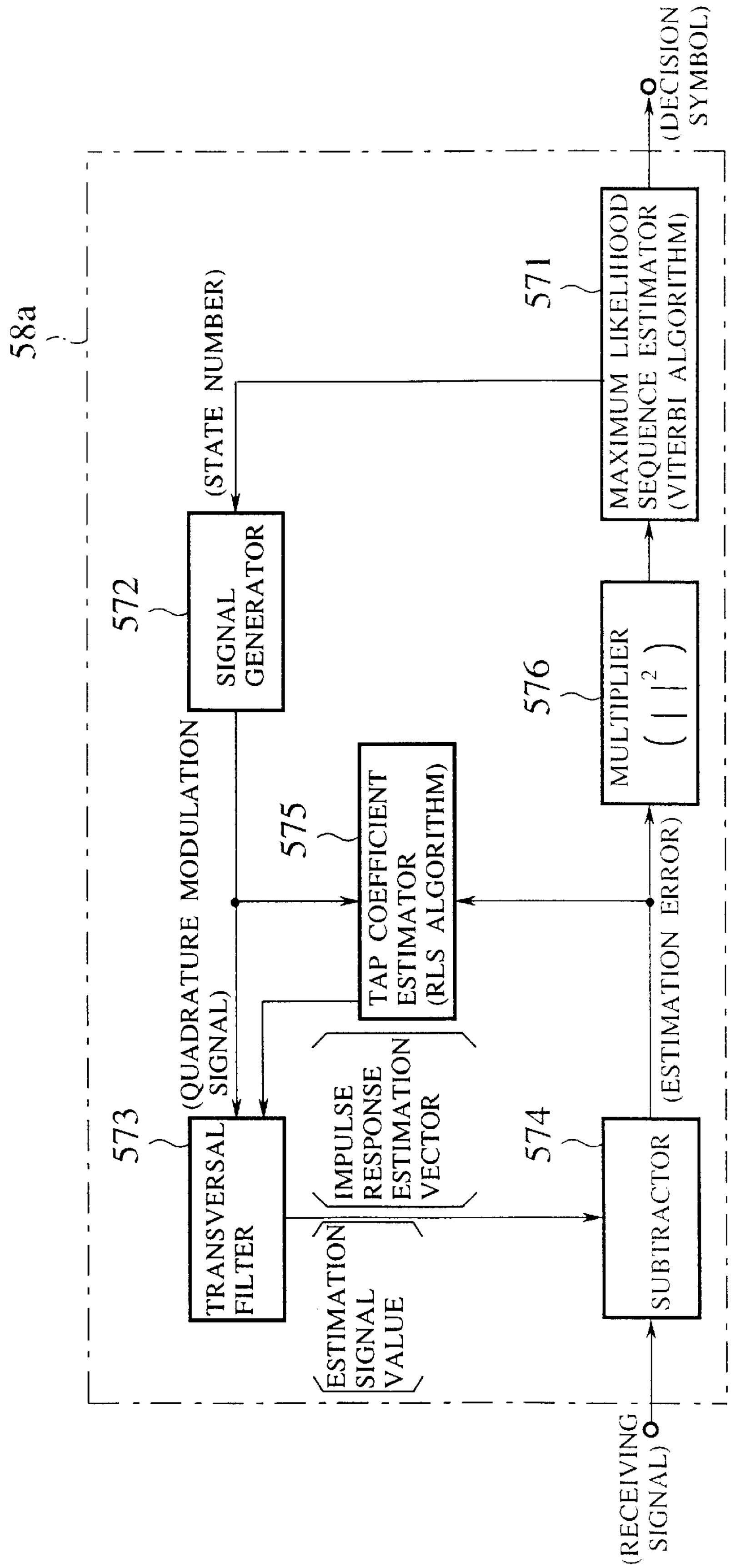
FIG. 17 is a block diagram showing an example of a configuration of an RLS-MLSE type adaptive equalizer.

For purposes of example, FIG. 17 shows an example of an RLS-MLSE type adaptive equalizer which has been introduced in an article, Kazuhiko FUGAWA and Hiroshi SUZUKI, "Characteristics of Recursive Least Square Type Adaptive Maximum Likelihood Sequence Estimation (RLS-MLSE) in Mobile Radio", Trans. IEICE (B-II), J75-B-II, No.8, pp.535–546 (1992–08). Operations of this adaptive equalizer will be explained briefly hereinbelow.

First, state numbers corresponding to state transitions of Viterbi algorithm used in Maximum Likelihood Sequence Estimation (MLSE) are output from a maximum likelihood sequence estimator 571 and then input into a signal generator 572. The signal generator 572 outputs an quadrature modulation signal corresponding to this state numbers. A transversal filter 573 multiplies an impulse response estimation vector and the quadrature modulation signal together to generate an estimation signal value. A subtractor 574 generates difference between the actual reception signal and the estimation signal value to calculate an estimation error.

The impulse response estimation vector used in the transversal filter 573 is updated by RLS algorithm in a tap coefficient estimator 575 to minimize an absolute value of the estimation error. The square of estimation error is input into the maximum likelihood sequence estimator 571 as branchmetric, and transmission symbol sequence is determined according to the Viterbi algorithm.

In the above literature of the RLS-MLSE equalizer, transmission characteristics have been set forth under the multi-path fading condition wherein delayed waves are present in the propagation paths, and there has been disclosed that such transmission characteristics can be improved rather than the case wherein no delayed wave is present. This is because the transmission characteristics can be improved by the path diversity effect. In the event that the same modulation signals are transmitted from a plurality of information transmitting radio base stations like the present embodiment, respective signal propagation paths spanning from the information transmitting radio base stations to the mobile station can be considered as independent ones, and usually delays are caused between the signals transmitted from respective information transmitting radio base stations. Therefore, the reception signals are put in the similar situation to that they are affected by the multi-path fading. For this reason, the transmission characteristics can be improved by installing the equalizer into the present embodiment.

If the present embodiment employing the equalizer therein is applied to a cellular system, the transmission characteristics can be improved near boundaries between cells. In general, in the cellular system, excellent transmission characteristics can be obtained near the base stations because reception power is increased, but transmission characteristics are degraded, rather than those near the base stations, near cell boundaries which are far from the base stations because reception power is decreased.

Figure 18:
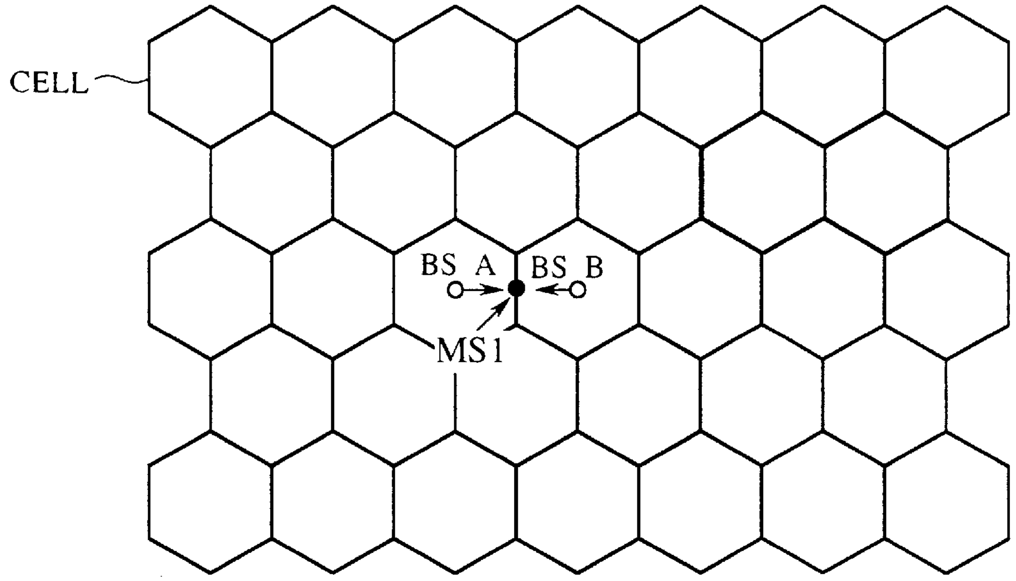
FIG. 18 is a view illustrating an example of signal reception in the event that the ninth embodiment of the present invention is applied to a cellular system.

However, in the present embodiment, since the same signals are transmitted from plural base stations, the mobile station can receive such signals transmitted from plural base stations near cell boundaries. For example, in the example shown in FIG. 18, the mobile station MS1 can receive the signals transmitted from both the base station A and the base station B. Hence, as described above, the diversity effect can be achieved by synthesizing these reception signals by the equalizer to therefore improve the transmission characteristics. In the above RLS-MLSE type equalizer, since the transversal filter is weighted adaptively in accordance with reception levels of the signals transmitted from plural base stations, seamless communication can be accomplished without disconnection of communication even when the mobile station MS1 moves from the base station A to the base station B. Because the transmission characteristics are not degraded due to the diversity effect near boundaries between cells, variation in the transmission characteristics can be suppressed small even when the mobile station moves around during reception of the signal, so that excellent communication can always be implemented.

Next, a tenth embodiment according to the high-speed radio communication system of the present invention will be explained.

The above ninth embodiment has become more effective because the path diversity effect can be attained firmly if the signals transmitted from respective information transmitting radio base stations are intentionally delayed. In the present tenth embodiment, delay amounts are determined for every base station, and the information signals are delayed intentionally based on the delay amounts respectively and then transmitted. It is possible to adjust the delay amounts between the radio base stations since the information transmitting radio base stations are connected via the information transmission network means 9.

Subsequently, an eleventh embodiment according to the high-speed radio communication system of the present invention will be explained.

In the eleventh embodiment, the delay amounts are also assigned to the base stations like the above tenth embodiment, but similar delay amounts are assigned to the base stations which are separated at a certain distance from each other. For instance, in the cellular system for mobile communication, in order to utilize the frequency effectively, the same frequencies are utilized repetitively in the base stations which are separated to such an extent as to avoid mutual interference. On the contrary, in the present embodiment, the same delay amounts are utilized repetitively.

Figure 19:
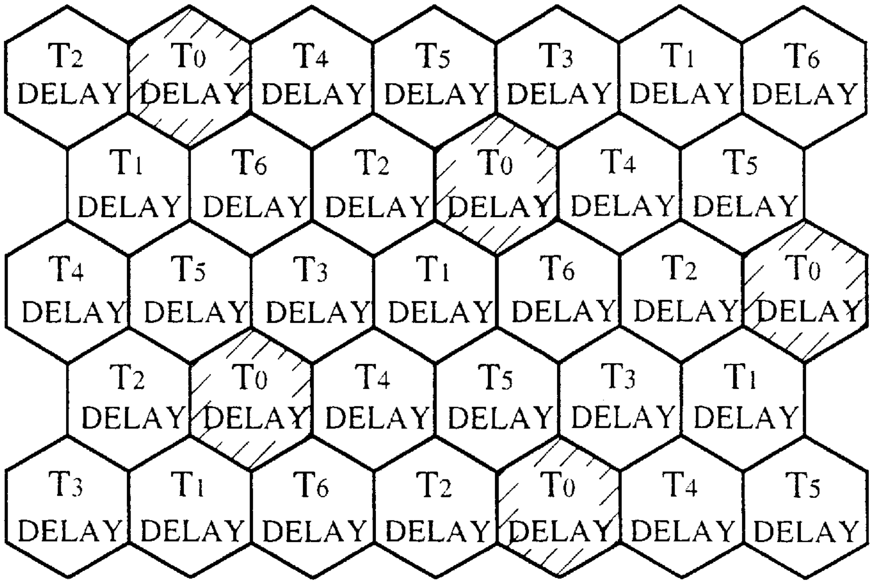
FIG. 19 is a view illustrating an example of assignment of delay amount (seven cell repetition) in the event that delay amounts are used repetitively in the cellular system based on an eleventh embodiment of the present invention.

In FIG. 19, an example of delay amount assignment is illustrated in the event that delay amounts are used repetitively in the cellular system. In FIG. 19, the delay amounts are utilized repetitively with setting up seven cells as one unit. Therefore, design procedures for applying the present embodiment concretely to the cellular system can be simplified since an allover area can be covered by seven kinds of delay amounts ($T_0$, $T_1$, . . . , $T_6$).

Figure 20:
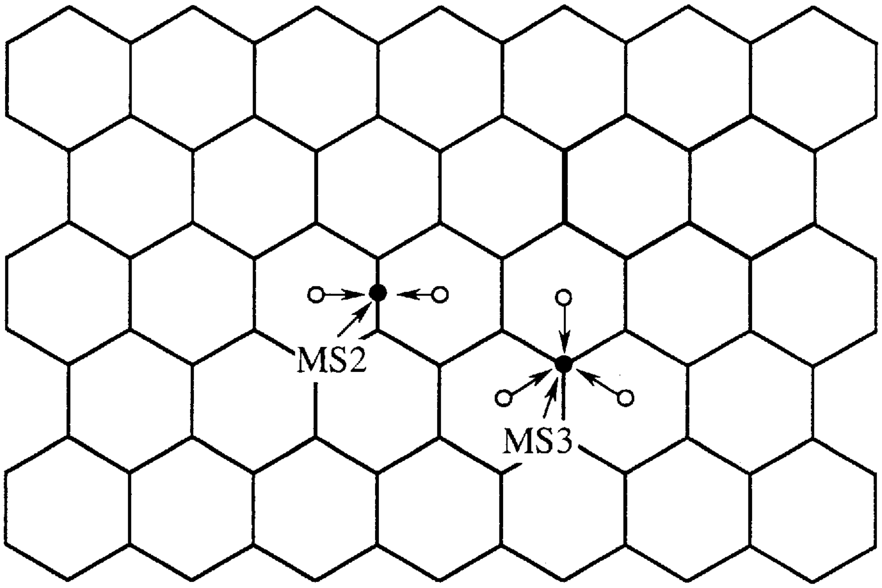
FIG. 20 is a view illustrating kinds of delay amount in the cellular system.

Although seven kinds of delay amounts have been assigned repetitively in FIG. 19, kinds of delay amount may be reduced further in case the diversity effect is taken into account. For purposes of example, as shown in FIG. 20, the mobile station may receive mainly two signals transmitted from two base stations if it is positioned at the location MS2 on the cell configuration. Likewise the mobile station may receive mainly three signals transmitted from three base stations if it is positioned at the location MS3. Consequently, in the cellular system as shown in FIG. 20, an overall area can be covered enough by arranging three kinds of delay amount repetitively.

Figure 21:
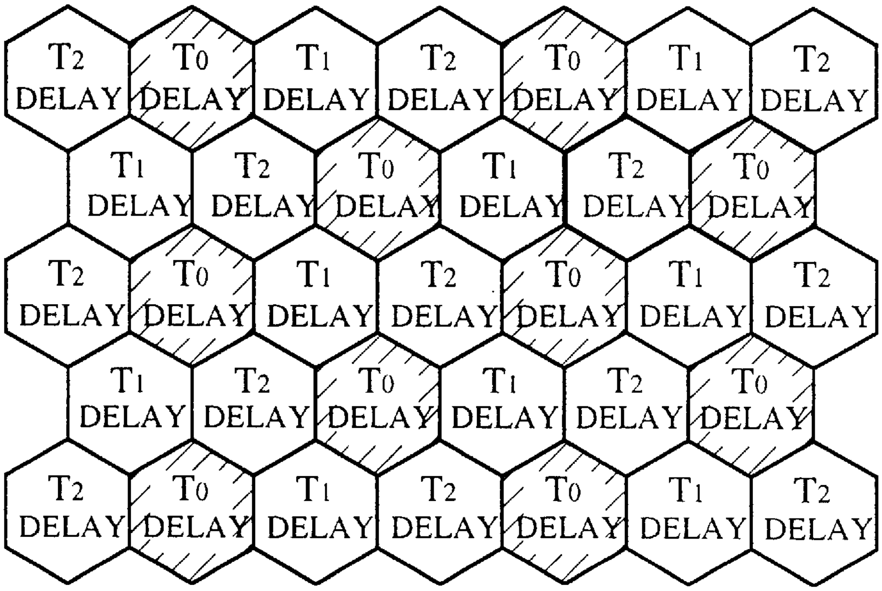
FIG. 21 is a view illustrating another example of assignment of delay amount (three cell repetition)

In FIG. 21, assignment of delay amount is illustrated in case three cell repetition is employed in the cellular system. Like this, it is desired that kinds of delay amount should be selected according to the situation of the cell configuration to have the appropriate number.

In place of the above fixed assignment of delay amount, assignment of delay amount may be selected appropriately depending upon cell shapes and communication utilization state in the cells. Thus design procedures to assign delay amount can be facilitated, and more effective assignment can be implemented by fewer kinds of delay amount.

In turn, a twelfth embodiment according to the high-speed radio communication system of the present invention will be explained.

Figure 22:
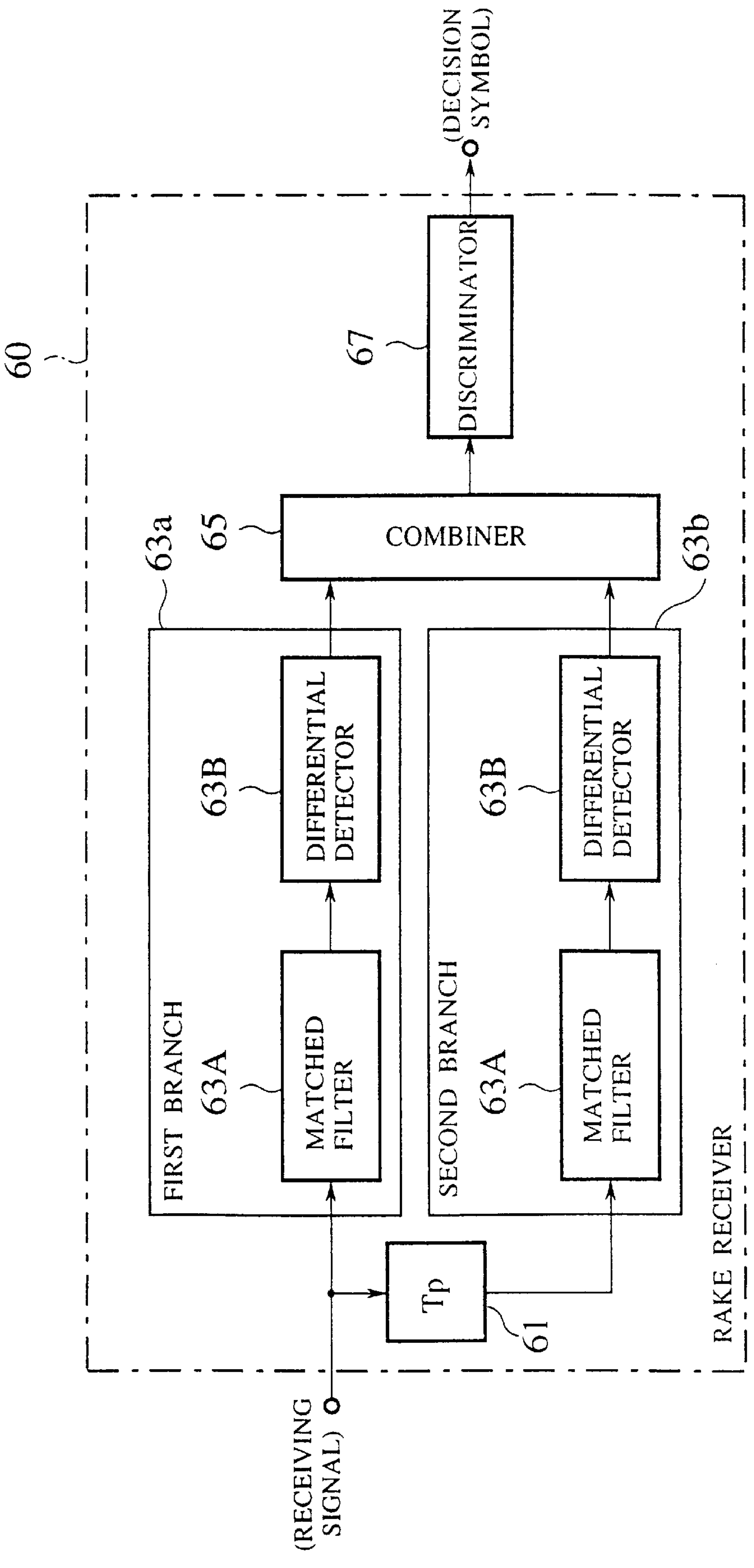
FIG. 22 is a block diagram showing an example of a configuration of a RAKE receiver according to a twelfth embodiment of the present invention.

In the twelfth embodiment, spread spectrum modulation system and a RAKE receiver are used to transmit. In the spread spectrum modulation system, the signal is spread into the frequency bandwidth which is extremely broader than the bandwidth necessary for transmission of the information signals and then transmitted, while this spread bandwidth of the signal is restored into the original bandwidth by inverse spread on the receiver side. However, this system is greatly affected by multi-path fading since the transmission signal is a broad bandwidth signal. Therefore, in the spread spectrum modulation system, multi-path can be synthesized by the RAKE receiver to achieve the path diversity effect. An example of a configuration of the RAKE receiver 60 is shown in FIG. 22.

Ideally, the RAKE receiver has branches equivalent to the number of multi-path. In the RAKE receiver 60 shown in FIG. 22, a two-branch configuration consisting of a first branch 63*a* and a second branch 63*b* is adopted to receive the signals over two paths. The branches 63*a*, 63*b* are composed of matched filters 63A and differential detectors 63B, respectively. Upon reception, the reception signal via the second branch is input after it is delayed by delay amount $T_p$. In each branch, inverse spread of the reception signal is carried out by the matched filter 63A and then the inverse spread signal is detected by the differential detector 63B. The detected signal is synthesized by a combiner 65 and then symbol decision is carried out by a discriminator 67.

In the present embodiment, the same signals are transmitted from a plurality of base stations. In this case, the number of path to be received is increased. For this reason, if the spread spectrum modulation system and the RAKE receiver are applied to the present embodiment, more number of paths can be synthesized by the RAKE receiver. In the twelfth embodiment, larger path diversity effect can be achieved rather than ordinary combination of the spread spectrum modulation system and the RAKE receiver to thus improve the transmission characteristics.

Of course, it is possible to implement either all the methods explained in the above embodiments or a part of combination thereof.

INDUSTRIAL APPLICABILITY

The high-speed radio communication system of the present invention may achieve effects such that a great deal of information of good quality can be transmitted at high speed.

In the present invention, the call signal and the answer signal can be transmitted via the low-speed communication network with good bandwidth efficiency. At the time of high-speed transmission, the diversity effect can be achieved by implementing multistation simultaneous transmission, so that high-speed communication can be accomplished with good quality.

In addition, by transmitting the controlling signals by radio, the system of the present invention can be constructed in combination with the portable terminals for mobile communication. Therefore, a large amount of information can be received anywhere at high speed. At this time, the call signal is transmitted to the broad zone while the answer signal is received from the narrow zone, and, as a result, registration of location of the information receiving means can be omitted and thus the system can be simplified. In addition, transmission power required for transmitting the answer signal can be reduced so that power consumption of the portable terminal can be reduced still more.

By providing the equalizing means, the information signals transmitted from a plurality of information transmitting means and having delay difference between them can be synthesized effectively and further the diversity effect can be achieved without expansion of the bandwidth at the time of multistation simultaneous transmission. Thereby, the information signals of good quality can be received without reduction of frequency utilization efficiency.

Since location of the information receiving means can be estimated based on the location of the answer receiving means, the information transmitting means to transmit the information signal can be limited in compliance with the estimated location, and also multistation simultaneous transmission can be carried out effectively and with good efficiency.

Further, by providing a dedicated highly sensitive antenna for receiving the information signal in the mobile station, reduction in reception sensitivity due to broad bandwidth can be compensated.

In case the information signal with sufficient quality has not received, the information signals are transmitted again by providing retransmission request function to the information receiving means and the centralized control means, so that sufficient quality can always be obtained when receiving the information signals.

By intentionally delaying the information signals transmitted from respective information transmitting means, greater diversity effect can be attained. As a result, transmission with high quality can be implemented at high speed.

By utilizing repetitively the same delay amounts separately at a certain distance from each other, the actual system can be constructed by virtue of limited delay amount.

If the information signals transmitted from respective information transmitting means are transmitted via the spread spectrum modulation system and then they are received via the RAKE receiver, the transmission system which enables high-speed transmission with good quality can be constructed.

If the present invention is formed as the cellular system like the vehicle/portable telephone system, the television broadcasting can be applied to the vehicle reception system, for example, so that reception of high-quality television images can be enabled.

We claim:

1. A high-speed radio communication system comprising:

centralized controlling means for controlling flow of signals;

calling means for transmitting a call signal in response to a call instruction signal transmitted from said centralized controlling means;

information receiving means for receiving said call signal output from said calling means to transmit an answer signal;

answer receiving means for receiving said answer signal output from said information receiving means to transmit an answer acknowledge signal; and information transmitting means for receiving an information/control signal transmitted from said centralized controlling means in response to said answer acknowledge signal output from said answer receiving means, and for transmitting an information signal carrying a larger amount of information at higher speed to said information receiving means by radio relative to a speed of said call signal from said calling means to said information receiving means.

2. A high-speed radio communication system according to claim 1, wherein said call signal and said answer signal are transmitted by radio.

3. A high-speed radio communication system according to claim 2, wherein said calling means transmits said call signal to a broad zone, while said answer receiving means receives said answer signal from a narrow zone.

4. A high-speed radio communication system according to claim 2, wherein said information receiving means includes a first antenna for receiving said call signal, and a second antenna for receiving said information signals, reception sensitivity of said second antenna being increased compared with that of said first antenna.

5. A high-speed radio communication system according to claim 1, wherein said information receiving means includes a first antenna for receiving said call signal, and a second antenna for receiving said information signals, reception sensitivity of said second antenna being increased compared with that of said first antenna.

6. A high-speed radio communication system according to claim 5, wherein one antenna is shared with said first antenna and said second antenna by changing its configuration so as to change its sensitivity.

7. A high-speed radio communication system according to claim 1, wherein said information receiving means decides whether or not said information signal of good quality has been received, and transmits a signal requesting retransmission of said information signals concerned to said centralized controlling means if not, and said centralized controlling means retransmits said information signal to said information transmitting means if it has received said signal.

8. A high-speed radio communication system according to claim 1, wherein said information receiving means transmits a decision result that said information signal of good quality has been received or not to said centralized controlling means, and said centralized controlling means retransmits said information signal to said information transmitting means if it decides based on said decision result received that said information signal has not been received.

9. A high-speed radio communication system according to claim 1, wherein said information receiving means includes reception completion informing means for transmitting a reception completion signal to said information transmitting means after reception of said information signal has been completed.

10. A high-speed radio communication system according to claim 1, wherein said information transmitting means spontaneously terminates a series of operations required for information transmission unless it has received a retransmission request within a predetermined time interval after transmission of said information signal.

11. A high-speed radio communication system comprising:

centralized controlling means for controlling flow of signals;

calling means for transmitting a call signal in response to a call instruction signal transmitted from said centralized controlling means;

information receiving means for receiving said call signal output from said calling means to transmit an answer signal;

answer receiving means for receiving said answer signal output from said information receiving means to transmit an answer acknowledge signal;

information transmitting/distributing means for distributing information/control signal transmitted from said centralized controlling means in response to said answer acknowledge signal output from said answer receiving means; and a plurality of information transmitting means for transmitting information signals out of said information/control signals transmitted via said information transmitting/distributing means to said information receiving means by radio.

12. A high-speed radio communication system according to claim 11, wherein frames of said information signals transmitted respectively from a plurality of said information receiving means are synchronized with each other.

13. A high-speed radio communication system according to claim 11, wherein said information receiving means includes equalizing means for equalizing said information signals transmitted respectively from a plurality of said information transmitting means.

14. A high-speed radio communication system according to claim 11, wherein said centralized controlling means includes selecting means for estimating location of said information receiving means from location of said answer signal receiving means which has transmitted said answer acknowledge signal, and for selecting plural information transmitting means, from which said information signals are to be transmitted, in response to said estimated location.

15. A high-speed radio communication system according to claim 13, wherein each of said plurality of information transmitting means includes information signal delay controlling means for delaying said information signals based on a delay amount decided for each of said plurality of information transmitting means.

16. A high-speed radio communication system according to claim 15, wherein, upon assigning delay amounts, said information signal delay controlling means assigns an equal delay amount to said information transmitting means which are separated by a predetermined distance.

17. A high-speed radio communication system according to claim 11, wherein said information transmitting means transmits said information signals in compliance with a spread spectrum modulation system, and said information receiving means utilizes a RAKE receiver.

18. A high-speed radio communication system according to claim 11, wherein said call signal and said answer signal are transmitted by radio.

19. A high-speed radio communication system according to claim 11, wherein said information receiving means includes a first antenna for receiving said call signal, and a second antenna for receiving said information signals, reception sensitivity of said second antenna being increased compared with that of said first antenna.

20. A high-speed radio communication system according to claim 11, wherein said information receiving means decides whether or not said information signal of good quality has been received, and transmits a signal requesting retransmission of said information signals concerned to said centralized controlling means if not, and said centralized controlling means retransmits said information signal to said information transmitting means if it has received said signal.

* * * * *